(12) United States Patent
Ohsugi et al.

(10) Patent No.: US 9,199,603 B2
(45) Date of Patent: Dec. 1, 2015

(54) GAS GENERATOR

(71) Applicant: NIPPON KAYAKU KABUSHIKI KAISHA, Chiyoda-ku (JP)

(72) Inventors: Satoshi Ohsugi, Himeji (JP); Yusuke Tanaka, Himeji (JP); Naoki Izaki, Himeji (JP); Yoshitaka Iwai, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 14/424,764

(22) PCT Filed: Aug. 29, 2013

(86) PCT No.: PCT/JP2013/073100
§ 371 (c)(1),
(2) Date: Feb. 27, 2015

(87) PCT Pub. No.: WO2014/034757
PCT Pub. Date: Mar. 6, 2014

(65) Prior Publication Data
US 2015/0217717 A1     Aug. 6, 2015

(30) Foreign Application Priority Data
Aug. 29, 2012  (JP) ................................. 2012-188641

(51) Int. Cl.
*B60R 21/264* (2006.01)
*C06D 5/00* (2006.01)
*B60R 21/26* (2011.01)

(52) U.S. Cl.
CPC ................ *B60R 21/264* (2013.01); *C06D 5/00* (2013.01); *B60R 2021/26011* (2013.01); *B60R 2021/26029* (2013.01)

(58) Field of Classification Search
CPC ..................... B60R 21/264; B60R 2021/2642; B60R 2021/2648
USPC ............. 102/530, 531, 202.9, 202.12, 202.14
See application file for complete search history.

(56) References Cited

U.S. PATENT DOCUMENTS

| | | | | |
|---|---|---|---|---|
| 5,779,268 | A | * | 7/1998 | Smith et al. .................... 280/741 |
| 8,375,862 | B2 | * | 2/2013 | Morgan et al. ................ 102/530 |

(Continued)

FOREIGN PATENT DOCUMENTS

| | | |
|---|---|---|
| JP | 2009-137478 | 6/2009 |
| JP | 2010-070073 | 4/2010 |
| JP | 2010-143270 | 7/2010 |
| JP | 2010-173559 | 8/2010 |

(Continued)

OTHER PUBLICATIONS

International Search Report Issued Dec. 10, 2013 in PCT/JP13/073100 Filed Aug. 29, 2013.

*Primary Examiner* — Reginald Tillman, Jr.
(74) *Attorney, Agent, or Firm* — Oblon, McClelland, Maier & Neustadt, L.L.P.

(57) ABSTRACT

A gas generator includes a bottom plate part which is a part of a housing, a cup-shaped member accommodating a transfer charge, a cylindrical filter accommodated in the housing, and an annular first pad member situated in a part on the side of the bottom plate part of a combustion chamber. The cup-shaped member is arranged to project toward inside the combustion chamber, and has a first extension part extending outwardly in the radial direction from a part on the side of an open end along the bottom plate part. The first pad member has a second extension part extending inwardly in the radial direction from an abutting part abutting on the inner circumferential face of the filter along the bottom plate part. By sandwiching the first extension part between the bottom plate part and the second extension part, the cup-shaped member is fixed to the bottom plate part.

12 Claims, 20 Drawing Sheets

(56) References Cited

U.S. PATENT DOCUMENTS 9,051,225 B1 * 6/2015 Quioc ................................. 1/1
2010/0071580 A1 3/2010 Nakayasu et al.
2013/0276663 A1 * 10/2013 Ohsugi et al. ................. 102/530

FOREIGN PATENT DOCUMENTS

| JP | 2010-173560 | 8/2010 |
| JP | 2010-234843 | 10/2010 |
| JP | 2012-040943 | 3/2012 |

* cited by examiner

GAS GENERATOR

TECHNICAL FIELD

The present invention relates to a gas generator to be incorporated into a passenger protecting device, and more specifically, to a so-called disc-type gas generator to be incorporated into an air-bag device installed, for example, in a steering wheel of an automobile.

BACKGROUND ART

Conventionally, from the view point of protecting a passenger of an automobile or the like, an air-bag device which is a passenger protective device has been widely used. An air-bag device is installed to protect a passenger from impact occurring at the time of collision of a vehicle or the like, and in the case of collision of a vehicle or the like, an air bag instantly expands and develops as a cushion to receive the body of the passenger.

A gas generator is a device incorporated into such an air-bag device, for igniting an igniter by electrification from a control unit in the case of a collision of a vehicle or the like, and combusting a gas generating agent by a flame occurring in the igniter to generate a large quantity of gas instantly, thereby expanding and developing the air bag. An air-bag device is installed, for example, in a steering wheel or an instrument panel of an automobile.

Among gas generators having a variety of structures, there is a so-called disc-type gas generator that is preferably utilized in an air-bag device of the driver's seat installed in a steering wheel or the like. A disc-type gas generator has a short cylindrical housing having closed axial end parts, and a gas discharge opening provided on the circumferential wall of the housing, and in the housing, a gas generating agent is accommodated to surround an igniter situated inside the housing, and a filter is accommodated to surround the circumference of the gas generating agent.

In this disc-type gas generator, generally, a transfer charge (enhancer agent) as a combustion promoter is disposed between the combustion chamber in which the gas generating agent is accommodated and the igniter to ensure ignition of the gas generating agent by a flame occurring in the igniter. Usually, the transfer charge is accommodated in a transfer charge chamber provided inside the cup-shaped member, and the cup-shaped member is disposed to project inside the combustion chamber so that the transfer charge chamber faces an ignition part accommodating an ignition charge of the igniter.

As the cup-shaped member, there are known a so-called enhancer holder and a so-called enhancer cup. The former is a member having high mechanical strength such as a stainless alloy and is previously provided with an opening which is closed with a sealing tape to allow breakage of the closure of the sealing tape at the time of actuation. The latter uses a member having low mechanical strength such as aluminum, to allow breakage or melting in its entire surface at the time of actuation.

Here, the cup-shaped member partitions the transfer charge chamber in which the transfer charge is accommodated and the combustion chamber in which the gas generating agent is accommodated so as to obtain intended combustion characteristics at the time of actuation of the gas generator, and need to be assembled to the housing so that at least these transfer charge and gas generating agent will not mix each other. From this point of view, conventionally, assembling of the cup-shaped member to the housing is generally conducted by swaging fixation or press-fitting fixation.

For example, in the gas generator disclosed in Japanese Patent Laying-Open No. 2010-234843 (PTD 1), a cup-shaped member is provided with a flange part, and a housing is provided with a collar part for swaging, and by swaging the collar part so that the flange part is retained by the collar part, the cup-shaped member is fixed to the housing.

For example, in the gas generator disclosed in Japanese Patent Laying-Open No. 2010-173560 (PTD 2), a projecting cylindrical part that projects toward a combustion chamber is provided at a predetermined position of a housing, and an open end of a cup-shaped member is press-fitted in the projecting cylindrical part to fix the cup-shaped member to the housing.

CITATION LIST

Patent Document

PTD 1: Japanese Patent Laying-Open No. 2010-234843
PTD 2: Japanese Patent Laying-Open No. 2010-173560

SUMMARY OF INVENTION

Technical Problem

However, when swaging fixation is employed as described above, it is necessary to provide the housing with a collar part for swaging which is difficult to be molded by pressing. This inevitably requires conducting cutting or the like on the housing, and leads the problem of increase in production cost. Also, the necessity of conducting the swaging fixation as described above in production of a gas generator complicates the assembling operation, and leads increase in the production cost in association with this.

On the other hand, when the press-fitting fixation is employed as described above, the effect of reducing the production cost is obtained compared with the case of employing the swaging fixation; however, there is a fear that the cup-shaped member will fall off the housing due to application of vibration because the gas generator is installed in a vehicle or the like. For preventing this, it is necessary to strictly manage the assembling strength, and additional problem of increase in the production cost arises in association with this. Further, when the enhancer cup having low strength as described above is used, the enhancer cup can buckle at the time of press-fitting, and this causes decrease in the yield and leads the problem of increase in the production cost.

Therefore, the present invention has been devised to solve the aforementioned problems, and aims at providing a gas generator that allows secure and easy assembling of a cup-shaped member accommodating a transfer charge to a housing, and thus achieves reduction in production cost.

Solution to Problem

A gas generator according to the present invention includes a housing, an igniter, a cup-shaped member, a filter, and a first pad member. The housing is formed of a short cylindrical member made up of a top plate part and a bottom plate part that close axial end parts, and a peripheral wall part provided with a gas discharge opening, and contains a combustion chamber accommodating a gas generating agent. The igniter is attached to the bottom plate part and includes an ignition part accommodating an ignition charge that will ignite at the time of actuation. The cup-shaped member has a substantially cylindrical shape opening in an end part on the side of the bottom plate part, and contains a transfer charge chamber accommodating a transfer charge, and is disposed to project toward inside the combustion chamber in such a manner that the transfer charge chamber faces the ignition part. The filter is situated inside the housing, and is formed of a cylindrical member disposed to surround the combustion chamber in a radial direction of the housing. The first pad member is situated between the bottom plate part and the gas generating agent in a part of the combustion chamber on the side of the bottom plate part, and is formed of an annular member that is applied to cover a boundary between the filter and the bottom plate part. The cup-shaped member has a top wall part and a lateral wall part defining the transfer charge chamber, and a first extension part extending outwardly in the radial direction along the inner bottom face of the bottom plate part from a part of the lateral wall part on the side of the open end. The first pad member has an abutting part abutting with the inner circumferential face of an axial end part situated on the side of the bottom plate part of the filter, and a second extension part extending from the abutting part inwardly in the radial direction along the inner bottom face of the bottom plate part. In the gas generator according to the present invention, by arranging at least a part of the first extension part between the bottom plate part and the second extension part along the axial direction of the housing, movement of the cup-shaped member along the axial direction of the housing is restricted, and thereby the cup-shaped member is assembled to the bottom plate part.

In the gas generator according to the present invention, preferably, at least a part of the first extension part is sandwiched and retained between the bottom plate part and the second extension part along the axial direction of the housing to fix the cup-shaped member to the bottom plate part.

In the gas generator according to the present invention, preferably, between the second extension part and the bottom plate part of a part defining the combustion chamber, a space where the first extension part is not situated is formed.

Preferably, the gas generator according to the present invention further includes a retainer provided on the bottom plate part for retaining the igniter. In this case, preferably, the bottom plate part is provided with an opening through which the igniter is inserted and arranged, and preferably, the retainer is formed of a resin molded part at least partly fixed to the bottom plate part by being formed by hardening a fluid resin material that is adhered to the bottom plate part in such a manner that the fluid resin material reaches a part of the outer face of the bottom plate part from a part of the inner face of the bottom plate part through the opening. Also in this case, preferably, the cup-shaped member is further fixed to the retainer by press-fitting a part of the cup-shaped member on the side of the open end of the lateral wall part into a part of the retainer situated inside the housing.

In the gas generator according to the present invention, preferably, either the inner circumferential face in a part on the side of the open end of the lateral wall part of the cup-shaped member or the outer circumferential face in a part of the retainer situated inside the housing is provided with a first projection part, and in this case, preferably, in the part where the first projection part is provided, the cup-shaped member is press-fitted into the retainer.

In the gas generator according to the present invention, preferably, the surface of the bottom plate part in a part covered by the retainer is provided with a protrusion for preventing rotation, or a recess for preventing rotation to prevent the retainer from relatively rotating with respect to the bottom plate part.

In the gas generator according to the present invention, preferably, the bottom plate part has a projecting cylindrical part projecting toward the top plate part, and in this case, preferably, the opening is provided in an axial end part situated on the side of the top plate part of the projecting cylindrical part. Also in this case, preferably, the first extension part is press-fitted into the projecting cylindrical part to further fix the cup-shaped member to the bottom plate part.

In the gas generator according to the present invention, preferably, either the inner circumferential face of the first extension part or the outer circumferential face of the projecting cylindrical part is provided with a second projection part, and in this case, preferably, in the part where the second projection part is provided, the cup-shaped member is press-fitted into the projecting cylindrical part.

In the gas generator according to the present invention, preferably, the bottom plate part has a projecting cylindrical part projecting toward the top plate part, and in this case, preferably, the opening is provided in an axial end part situated on the side of the top plate part of the projecting cylindrical part. Also, in this case, preferably, the cup-shaped member is plastically deformed by being pushed against the projecting cylindrical part to form the first extension part, and the first extension part is pressure joined with the projecting cylindrical part to further fix the cup-shaped member to the bottom plate part.

Preferably, the gas generator according to the present invention further includes a cushion member situated between the top plate part and the gas generating agent in a part on the side of the top plate part of the combustion chamber, for pushing the gas generating agent toward the bottom plate part, and in this case, the cushion member may be brought into abutment with the top wall part of the cup-shaped member to further fix the cup-shaped member to the bottom plate part.

Preferably, the gas generator according to the present invention further includes a second pad member situated between the top plate part and the gas generating agent in a part on the side of the top plate part of the combustion chamber, and applied to cover a boundary between the filter and the top plate part, and in this case, the second pad member may be brought into abutment with the top wall part of the cup-shaped member to further fix the cup-shaped member to the bottom plate part.

In the gas generator according to the present invention, the top plate part may be brought into abutment with the top wall part of the cup-shaped member to further fix the cup-shaped member to the bottom plate part.

In the gas generator according to the present invention, preferably, the housing at least has a lower shell including the bottom plate part and an upper shell including the top plate part, and in this case, preferably, the lower shell is formed of a press molded product molded by pressing a metallic member.

In the gas generator according to the present invention, preferably, the cup-shaped member is formed of such a member that at least the top wall part and the lateral wall part rupture or melt as the transfer charge combusts at the time of actuation of the igniter.

Advantageous Effects of Invention

According to the present invention, it is possible to make a gas generator that allows secure and easy assembling of the cup-shaped member accommodating the transfer charge to the housing, and thus achieves reduction in production cost.

DESCRIPTION OF EMBODIMENTS

Figure 1:
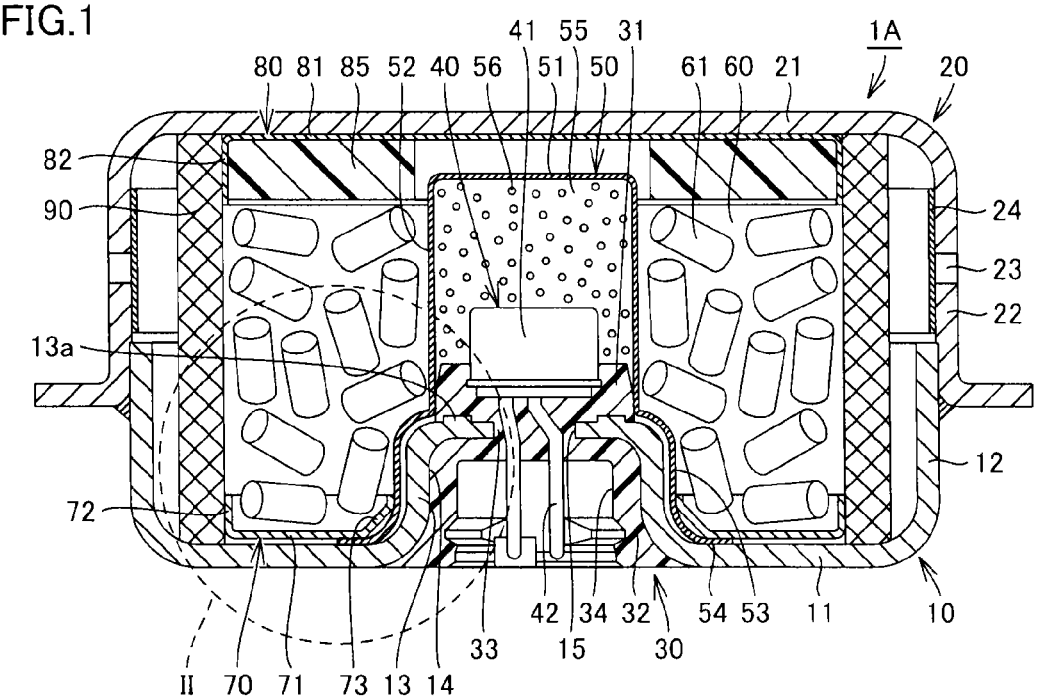
FIG. 1 is a schematic view of a gas generator in Embodiment 1 of the present invention.

Hereinafter, embodiments of the present invention will be described in detail with reference to drawings. In the following embodiments, the present invention is applied to a disc-type gas generator to be incorporated into an air-bag device mounted in a steering wheel of an automobile or the like. In the following embodiments, an identical or common part is denoted by the same reference numeral in the drawings, and description thereof will not be repeated.

Embodiment 1

Figure 2:
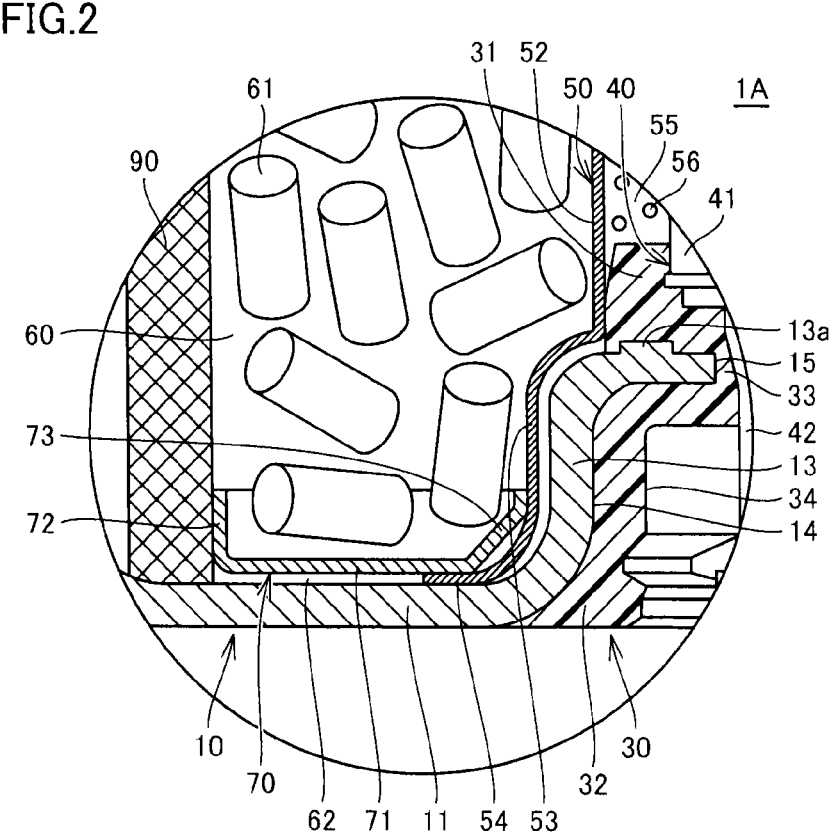
FIG. 2 is an enlarged schematic sectional view of an essential part of the gas generator shown in FIG. 1.
Figure 3:
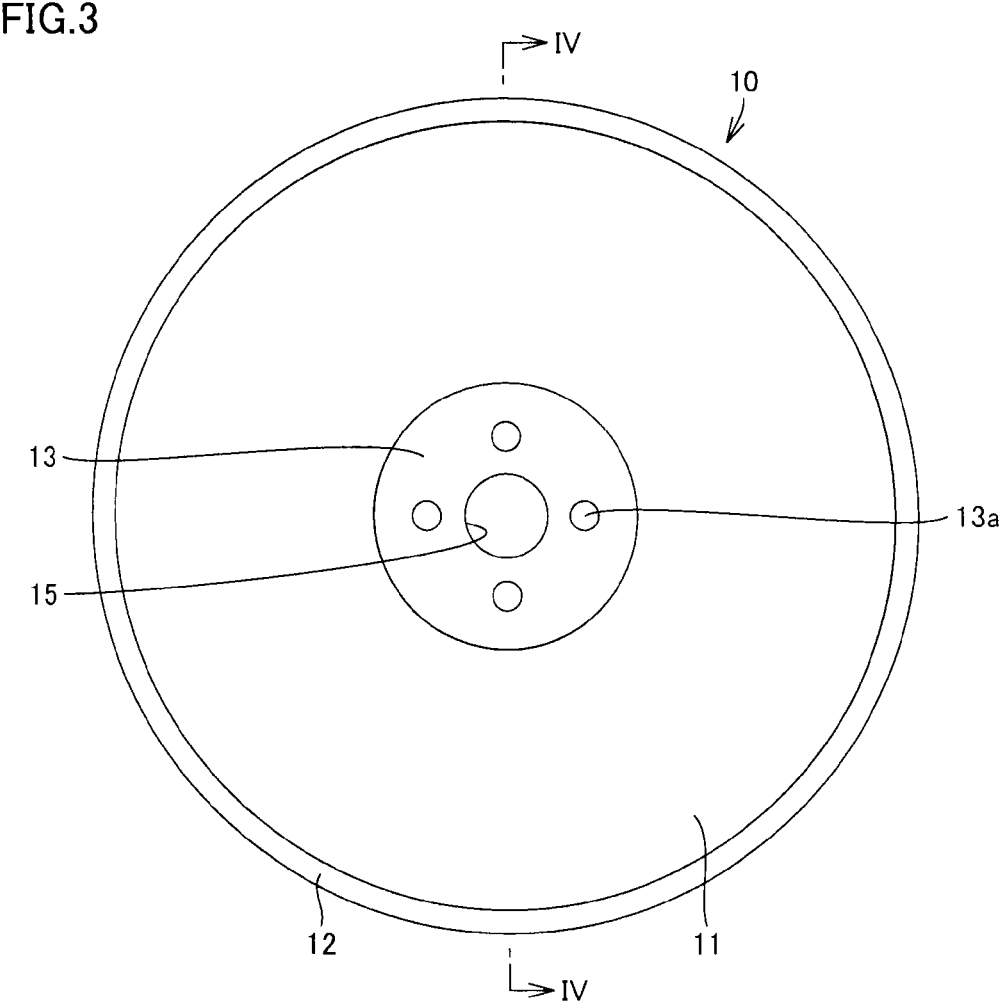
FIG. 3 is a plan view of a lower shell of the gas generator shown in FIG. 1.
Figure 4:
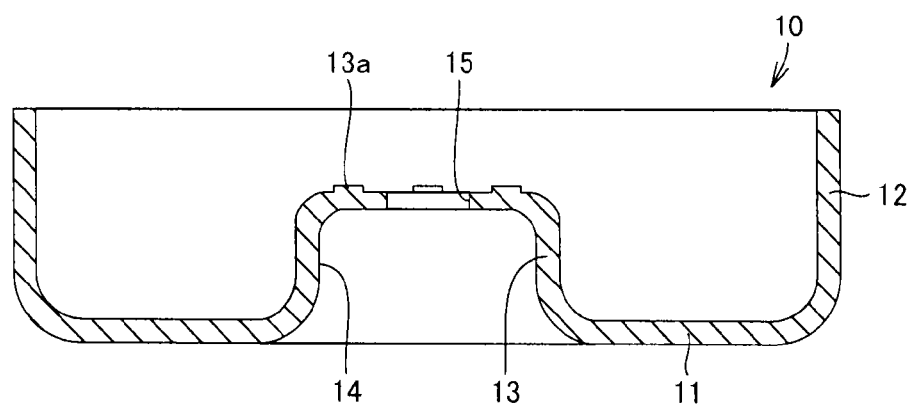
FIG. 4 is a sectional view of the lower shell of the gas generator shown in FIG. 1.
Figure 5:
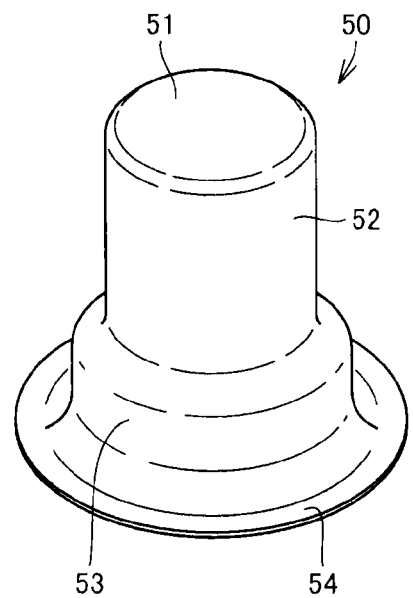
FIG. 5 is a perspective view of a cup-shaped member of the gas generator shown in FIG. 1.

FIG. 1 is a schematic view of a gas generator in Embodiment 1 of the present invention, and FIG. 2 is an enlarged schematic sectional view of an essential part of region II indicated in FIG. 1 of the gas generator shown in FIG. 1. FIG. 3 is a plan view of a lower shell of the gas generator shown in FIG. 1, and FIG. 4 is a sectional view along the line IV-IV shown in FIG. 3 of the lower shell. FIG. 5 is a perspective view of a cup-shaped member of the gas generator shown in FIG. 1. Referring to FIG. 1 to FIG. 5, structure of a gas generator 1A in Embodiment 1 of the present invention will be described.

As shown in FIG. 1, gas generator 1A in the present embodiment has a short and substantially cylindrical housing having closed axial ends, and accommodates in this housing, a retainer 30, an igniter 40, a cup-shaped member 50, a transfer charge 56, a gas generating agent 61, a first pad member 70, a second pad member 80, a filter 90 and so on as constituting parts. In the housing, a combustion chamber 60 mainly accommodating gas generating agent 61 among the aforementioned constituting parts is situated.

The short and substantially cylindrical housing includes a lower shell 10 and an upper shell 20. Each of lower shell 10 and upper shell 20 is formed of a press molded product formed by pressing a metallic member.

Lower shell 10 and upper shell 20 each formed into a substantially cylindrical shape having a bottom are combined and joined so that their open surfaces face each other to form the housing. Lower shell 10 has a bottom plate part 11 and a peripheral wall part 12, and upper shell 20 has a top plate part 21 and a peripheral wall part 22. As a result, axial end parts of the housing are closed by top plate part 21 and bottom plate part 11. For joining lower shell 10 and upper shell 20, electronic beam welding, laser welding, friction pressure welding and the like can be preferably used.

As shown in FIG. 1, FIG. 3 and FIG. 4, in a center part of bottom plate part 11 of lower shell 10, a projecting cylindrical part 13 that projects toward top plate part 21 is provided, and as a result, in the center part of bottom plate part 11 of lower shell 10, a recess part 14 is formed. Projecting cylindrical part 13 is a site where igniter 40 is fixed via retainer 30, and recess part 14 is a site which is to be a space for providing retainer 30 with a female connector part 34.

Projecting cylindrical part 13 is formed into a substantially cylindrical shape having a bottom, and in an axial end part situated on the side of top plate part 21, an opening 15 having a planarly annular shape is formed. Opening 15 is a site through which a pair of terminal pins 42 of igniter 40 are inserted. In the axial end part situated on the side of top plate part 21 of projecting cylindrical part 13, a plurality of protrusions 13a are formed projecting toward top plate part 21 so as to surround opening 15 as described above.

Lower shell 10 is manufactured by pressing a metallic member as described above. Concretely, lower shell 10 is manufactured into the shape shown in the drawing by pressing one metallic plate-like member from up and down directions, for example, by using a pair of molds consisting of an upper mold and a lower mold.

Here, as a metallic plate-like member constituting lower shell 10, for example, a metallic plate formed of stainless steel, iron steel, aluminum alloy, stainless alloy or the like, having a plate thickness before pressing of approximately more than or equal to 1.5 mm, and less than or equal to 3.0 mm is used, and preferably, a so-called high-tensile steel plate which will not be broken, or ruptured even by application of a tensile stress ranging from greater than or equal to 440 MPa and less than or equal to 780 MPa is preferably used. As a plate thickness after pressing, it is preferred that the thickness of the thinnest part is approximately greater than or equal to 1.0 mm. The pressing may be conducted by hot forging or cold forging; however, from the view point of improvement in dimensional accuracy, cold forging is more preferably employed.

Upper shell 20 is manufactured by pressing a metallic member as described above. Concretely, upper shell 20 is formed into a shape as shown in the drawing by pressing one metallic plate-like member from up and down directions, for example, by using a pair of molds consisting of an upper mold and a lower mold. Here, as the metallic plate-like member constituting upper shell 20, a metallic plate formed of stainless steel, iron steel, aluminum alloy, stainless alloy or the like, likewise the case of lower shell 10 described above can be used.

As shown in FIG. 1, igniter 40 is an ignition device for generating a flame, and includes an ignition part 41 and pair of terminal pins 42 as described above. Ignition part 41 contains an ignition charge that ignites and combusts to generate a flame, at the time of actuation, and a resistor for igniting the ignition charge. Pair of terminal pins 42 are connected with ignition part 41 for igniting the ignition charge.

More specifically, ignition part 41 includes a squib cup formed into a cup-like shape, and a base part that closes the open end of the squib cup and holds pair of terminal pins 42 penetrating therethrough. The resistor (bridge wire) is attached so as to connect tips of pair of terminal pins 42 inserted into the squib cup, and the ignition charge is packed in the squib cup so as to surround the resistor or be close to the resistor.

Here, as the resistor, Nichrome wire or the like is generally used, and as the ignition charge, ZPP (zirconium potassium perchlorate), ZWPP (zirconium tungsten potassium perchlorate), lead tricinate or the like is generally used. The aforementioned squib cup and base part are generally made of metal or plastic.

Upon detection of a collision, a predetermined amount of current flows into the resistor via terminal pins 42. Current flow of a predetermined amount in the resistor results in generation of Joule's heat in the resistor and the ignition charge starts combustion. A high-temperature flame generated by combustion causes the squib cup accommodating the ignition charge to rupture. The time from flowing of current into the resistor to actuation of igniter 40 is generally less than or equal to 2 milliseconds when Nichrome wire is used as the resistor.

Igniter 40 is attached to bottom plate part 11 while it is inserted from inside lower shell 10 so that terminal pins 42 penetrate through opening 15 provided in projecting cylindrical part 13. Concretely, on the periphery of projecting cylindrical part 13 provided in bottom plate part 11, retainer 30 formed of a resin molded part is provided, and igniter 40 is fixed to bottom plate part 11 by being retained by retainer 30.

Here, the size of opening 15 provided in projecting cylindrical part 13 is smaller than the contour of ignition part 41 which is the maximum contour part of igniter 40. With this configuration, even if unexpected breakage occurs in retainer 30, it is possible to prevent igniter 40 from passing through opening 15 and jumping out of the housing due to increase in the internal pressure of later-described combustion chamber 60, and thus safe operation of gas generator 1A is ensured.

Retainer 30 is formed by injection molding using a mold (more specifically insert molding), and is formed by adhering an insulating fluid resin material to bottom plate part 11 so that the insulating fluid resin material spans from a part of the inner face a part of the outer face of bottom plate part 11 through opening 15 provided in bottom plate part 11 of lower shell 10, and hardening the same.

Igniter 40 is inserted from inside of lower shell 10 so that terminal pins 42 penetrate through opening 15, in molding retainer 30, and by pouring the aforementioned fluid resin material to fill the space between igniter 40 and lower shell 10 in this condition, igniter 40 is fixed to bottom plate part 11 via retainer 30.

As a material for retainer 30 that is formed by injection molding, a resin material exhibiting excellent heat resistance, tolerance, corrosion resistance and the like after hardening is preferably selected and used. In this case, not only thermosetting resins represented by epoxy resin, but also thermoplastic resins represented by polybutylene terephthalate resin, polyethylene terephthalate resin, polyamide resin (e.g., nylon 6, and nylon 66), polypropylene sulfide resin, and polypropylene oxide resin can be used. In selecting such a thermoplastic resin as a material, it is preferred that the resin material contains glass fiber or the like as a filler in order to ensure mechanical strength of retainer 30 after molding. However, when sufficient mechanical strength is ensured only by the thermoplastic resin, it is not necessary to add a filler as described above.

Retainer 30 has an inner covering part 31 that covers part of the inner face of bottom plate part 11 of lower shell 10, an outer covering part 32 that covers part of the outer face of bottom plate part 11 of lower shell 10, and a connecting part 33 that is situated inside opening 15 provided in bottom plate part 11 of lower shell 10 and continuous to each of inner covering part 31 and outer covering part 32.

Retainer 30 is fixedly attached to bottom plate part 11 on the surface on the side of bottom plate part 11 of each of inner covering part 31, outer covering part 32 and connecting part 33. Also, retainer 30 is fixedly attached to the lateral face closer to the lower end of ignition part 41 and the bottom face of igniter 40, and to the surface of a part closer to the upper ends of terminal pins 42 of igniter 40. As a result, opening 15 is completely filled with terminal pins 42 and retainer 30, and sealing property in this part is ensured, and thus airtightness of combustion chamber 60 is ensured.

Inner covering part 31 of retainer 30 is provided to cover only an axial end part of projecting cylindrical part 13 provided in bottom plate part 11, and thus the outer circumferential face situated inside the housing of projecting cylindrical part 13 is not covered by retainer 30, but is exposed.

In the part facing the exterior of outer covering part 32 of retainer 30, female connector part 34 is formed. Female connector part 34 is a site for receiving a male connector of a harness (not shown) for connecting igniter 40 and a control unit (not shown), and is situated inside recess part 14 provided in bottom plate part 11 of lower shell 10. In female connector part 34, parts closer to the lower ends of terminal pins 42 of igniter 40 are exposed. In female connector part 34, a male connector is inserted, and thereby electric conduction between a core wire of the harness and terminal pins 42 is established.

Here, retainer 30 is formed to cover the plurality of protrusions 13a provided in projecting cylindrical part 13 described above. Concretely, the plurality of protrusions 13a are embedded in retainer 30 by being covered by inner covering part 31 of retainer 30. As a result, it is possible to prevent retainer 30 from rotating relatively to bottom plate part 11 after injection molding, and the plurality of protrusions 13a provided in projecting cylindrical part 13 described above function as protrusions for preventing rotation.

The positions where the plurality of protrusions 13a as protrusions for preventing rotation are not limited to the above, and may be provided in any position on the surface of bottom plate part 11 which is to be covered by retainer 30. A protrusion 13a as a protrusion for preventing rotation is not necessarily provided plurally but may be provided singly.

The aforementioned injection molding may be conducted by using lower shell 10 previously provided with an adhesive layer at a predetermined position in a part which is to be covered by retainer 30 on the surface of bottom plate part 11. The adhesive layer can be formed by previously applying an adhesive at a predetermined position of bottom plate part 11, and hardening the same.

As a result, the hardened adhesive layer is situated between bottom plate part 11 and retainer 30, so that it is possible to fix retainer 30 formed of a resin molded part to bottom plate part 11 more firmly. Therefore, it is possible to prevent retainer 30 from rotating relatively to bottom plate part 11 after injection molding. Also, by forming the adhesive layer annularly along the circumferential direction so as to surround opening 15 provided in bottom plate part 11, higher sealing property can be ensured in this part.

As an adhesive previously applied to bottom plate part 11, those containing a resin material that will exhibit excellent heat resistance, tolerance, corrosion resistance and the like after hardening as a raw material are preferably used, and for example, those containing cyanoacrylate resin or silicone resin as a raw material are particularly preferably used. Besides the aforementioned resin materials, those containing phenol resin, epoxy resin, melamine resin, urea resin, polyester resin, alkyd resin, polyurethane resin, polyimide resin, polyethylene resin, polypropyrene resin, polyvinyl chloride resin, polystyrene resin, polyvinyl acetate resin, polytetrafluoroethylene resin, acrylonitrile butadienestyrene resin, acrylonitrile styrene resin, acryl resin, polyamide resin, polyacetal resin, polycarbonate resin, polyphenyleneether resin, polybutylene terephthalate resin, polyethylene terephthalate resin, polyolefin resin, polyphenylene sulfide resin, polysulfone resin, polyethersulfone resin, polyarylate resin, polyetheretherketone resin, polyamideimide resin, liquid crystal polymer, styrene rubber, olefin rubber and the like are usable as the aforementioned adhesive.

The position where the adhesive is applied is not particularly limited, and the adhesive may be applied, for example, to the entire or part of the outer face in the part where projecting cylindrical part 13 of bottom plate part 11 is formed (surface of bottom plate part 11 in the part covered by outer covering part 32 of retainer 30) or may be applied to the entire or part of the inner face in the part where projecting cylindrical part 13 of bottom plate part 11 is formed (surface of bottom plate part 11 in the part covered by inner covering part 31 of retainer 30), or may be applied to the entire face of the surface of bottom plate part 11 in the part covered by retainer 30.

When igniter 40 having the squib cup and the base part constituting ignition part 41 formed of metallic members is used, an adhesive layer may be provided by previously applying an adhesive to a predetermined position on the surface of igniter 40 in the part that is to be covered by retainer 30. With this configuration, it is possible to fixedly attach igniter 40 to retainer 30 more firmly comparably to the case of providing bottom plate part 11 with an adhesive layer as described above, and it becomes possible to ensure higher sealing property in this part.

In the present embodiment, the case where retainer 30 is integrated with igniter 40 and lower shell 10 in molding of retainer 30 is exemplified; however, in molding of retainer 30, retainer 30 may be integrated only with lower shell 10, and igniter 40 may be assembled to retainer 30 after molding, for example, by fitting. In such a case, since retainer 30 is fixedly attached only to lower shell 10, the sealing property between retainer 30 and igniter 40 is not ensured only by this; however, an appropriate sealing treatment such as disposition of an O-ring in that part makes it possible to ensure sufficient sealing property.

On bottom plate part 11, cup-shaped member 50 is assembled so as to cover projecting cylindrical part 13, retainer 30 and igniter 40. Cup-shaped member 50 has a substantially cylindrical shape opening in the end part on the side of bottom plate part 11, and includes a transfer charge chamber 55 accommodating transfer charge 56. Cup-shaped member 50 is arranged to protrude into combustion chamber 60 accommodating gas generating agent 61 so that transfer charge chamber 55 provided in cup-shaped member 50 faces ignition part 41 of igniter 40.

As shown in FIG. 1, FIG. 2 and FIG. 5, cup-shaped member 50 has a top wall part 51 and a lateral wall part 52 that define transfer charge chamber 55 as described above, and a first extension part 53 extending from a part on the opening side of lateral wall part 52 outwardly in the radial direction. First extension part 53 extends along the inner bottom face of bottom plate part 11 of lower shell 10. Concretely, first extension part 53 has a curved shape that fits the shape of the inner bottom face of bottom plate part 11 in the part where projecting cylindrical part 13 is provided or in its vicinity, and includes a tip part 54 extending in the shape of a flange in its outer part in the radial direction.

Cup-shaped member 50 has no opening in top wall part 51 and in lateral wall part 52, and surrounds transfer charge chamber 55 provided therein. Cup-shaped member 50 will rupture or melt in association with increased pressure or conduction of generated heat inside transfer charge chamber 55 when transfer charge 56 is ignited as a result of actuation of igniter 40, and has relatively low mechanical strength. Therefore, as cup-shaped member 50, a member made of metal such as aluminum or aluminum alloy, or a member made of resin such as thermosetting resin represented by epoxy resin, or thermoplastic resin represented by polybutylene terephthalate resin, polyethylene terephthalate resin, polyamide resin (e.g., nylon 6, and nylon 66), polypropylene sulfide resin, and polypropylene oxide resin is preferably used.

As cup-shaped member 50, besides the above, a member made of metal having high mechanical strength as represented by iron or copper, and having an opening in its lateral wall part 52, to which a sealing tape is pasted so as to close the opening may be used.

Here, in the present embodiment, cup-shaped member 50 is fixed to bottom plate part 11 mainly by first pad member 70 as illustrated in the drawing, and a detailed assembling structure thereof will be described later.

Transfer charge 56 packed in transfer charge chamber 55 is ignited by a flame generated as a result of actuation of igniter 40, and combusts to generate thermoparticulates. As transfer charge 56, the one capable of securely starting combustion of gas generating agent 61 is required, and generally, a composition of metal powder/oxidizer represented by B/KNO$_3$ or the like is used. Transfer charge 56 used herein may be powdery or formed into a predetermined shape with a binder. Examples of the shape of transfer charge 56 formed with a binder include various shapes such as granule, solid cylinder, sheet, sphere, cylinder with single hole, cylinder with multiple holes, and tablet shapes.

In the internal space of the housing made up of lower shell 10 and upper shell 20, combustion chamber 60 accommodating gas generating agent 61 is situated in the space surrounding the part where cup-shaped member 50 as described above is disposed. Concretely, as described above, cup-shaped member 50 is disposed to protrude in combustion chamber 60 formed inside the housing, and the space provided in the part facing the outer surface of lateral wall part 52 of cup-shaped member 50 is configured as combustion chamber 60.

Also, in the space surrounding combustion chamber 60 in the radial direction of the housing, filter 90 is disposed along the inner circumference of the housing. Filter 90 has a cylindrical shape, and radially surrounds combustion chamber 60 accommodating gas generating agent 61 by being disposed in such a manner that its central axis substantially coincides with the axial direction of the housing.

Gas generating agent 61 is an agent for generating gas by being ignited by thermoparticulates generated as a result of actuation of igniter 40, and combusting. As gas generating agent 61, a non-azide gas generating agent is preferably used, and gas generating agent 61 is formed as a compact generally containing a fuel, an oxidizer and an additive. Examples of the fuel used herein include a tirazole derivative, a tetrazole derivative, a guanidine derivative, an azodicarboneamide derivative, a hydrazine derivative or a combination thereof. Concretely, for example, nitroguanidine, guanidine nitrate, cyanoguanidine, 5-aminotetrazole, or the like is preferably used. Examples of the oxidizer used herein include basic nitrates such as basic copper nitrate, perchlorates such as ammonium perchlorate and potassium perchlorate, and nitrates containing a cation selected from the group consisting of alkali metal, alkaline earth metal, transition metal, and ammonia. As the nitrate, for example, sodium nitrate, potassium nitrate or the like is preferably used. Examples of the additive include a binder, a slag forming agent, and a combustion modifier. As the binder, for example, an organic binder such as a metal salt or a stearate of carboxymethylcellulose, or an inorganic binder such as synthetic hydrotalcite or acidic white clay is preferably utilizable. As the slag forming agent, silicon nitride, silica, acidic white clay or the like is preferably utilizable. As the combustion modifier, metal oxide, ferrosilicon, activated carbon, graphite or the like is preferably utilizable.

The shape of the compact of gas generating agent 61 may be any of various shapes including particulates such as granules, pellets and cylinders, or a disc shape. As the cylindrical compact, a compact having a through hole in the compact (for example, single-hole cylindrical shape or a multi-hole cylindrical shape) is also employed. Preferably such a shape is appropriately selected depending on the specification of the air-bag device into which gas generator 1A is to be incorporated, and it is preferred to select an optimum shape depending on the specification, for example, by selecting such a shape that generation rate of gas during combustion of gas generating agent 61 varies with time. Besides the shape of gas generating agent 61, it is preferred to appropriately select the size or the packing amount of the compact by taking linear combustion rate, pressure exponent and the like of gas generating agent 61 into account.

Filter 90 used herein can be manufactured by winding a wire material of metal such as stainless steel or iron steel, followed by sintering, or by pressing a mesh material in which metal wire material is woven to compact the same, or by winding a porous metal plate. Here, as the mesh material, stockinette wire gauze, plain weave wire gauze, an assembly of crimp weave metal wire material or the like is used. As the porous metal plate, for example, expand metal that is processed into a mesh by making cuts in a zigzag pattern in a metal plate, and pushing it to expand to form pores, or hook metal that is produced by punching a metal plate while smashing burrs occurring in the peripheries of pores to flatten the same is used. In this case, the size and shape of formed pores can be appropriately changed as necessary, and pores of different sizes and shapes may be contained on the same metal plate. As the metal plate, for example, steel plate (mild steel) or stainless steel plate is preferably used, and a nonferrous metal plate of aluminum, copper, titanium, nickel or an alloy thereof or the like can also be used.

Filter 90 functions as cooling means for cooling gas by removing high temperature heat possessed by gas when the gas generated in combustion chamber 60 passes through filter 90, and also functions as removing means for removing a residue (slag) or the like contained in gas. Therefore, in order to cool the gas sufficiently and prevent the residue from being discharged outside, it is necessary to make the gas generated in combustion chamber 60 securely pass through filter 90.

In peripheral wall part 22 of upper shell 20 in the part facing filter 90, a plurality of gas discharge openings 23 are provided. This gas discharge opening 23 is provided for guiding the gas having passed through filter 90 outside the housing. On the principal plane situated on the side of filter 90 of peripheral wall part 22 of upper shell 20, a sealing tape 24 is pasted so as to close gas discharge opening 23. As sealing tape 24, an aluminum foil with a sticky member applied to one face or the like is used. This ensures the airtightness of combustion chamber 60.

In combustion chamber 60, first pad member 70 is disposed in the vicinity of the end part situated on the side of bottom plate part 11. First pad member 70 has an annular shape, and is disposed so as to be substantially brought into abutment with filter 90 and bottom plate part 11 to cover the boundary part between filter 90 and bottom plate part 11. As a result, first pad member 70 is situated between bottom plate part 11 and gas generating agent 61, in the vicinity of the upper end part of combustion chamber 60.

First pad member 70 has an abutting part 72 standing in abutment with the inner circumferential face of the axial end part situated on the side of bottom plate part 11 of filter 90, and a second extension part 71 extending inwardly in the radial direction from abutting part 72. Second extension part 71 extends along the inner bottom face of bottom plate part 11 of lower shell 10. Concretely, second extension part 71 is bent to conform to the shape of the inner bottom face of bottom plate part 11 including the part provided with projecting cylindrical part 13, and includes a tip part 73 standing in an inner part in the radial direction.

First pad member 70 is outflow preventing means for preventing the gas generated in combustion chamber 60 from flowing out from the gap between the lower end of filter 90 and bottom plate part 11 without flowing inside filter 90, in actuation. First pad member 70 is formed, for example, by pressing a plate-like member made of metal, and is preferably formed of a member formed of a steel plate of common steel or special steel (for example, cold-rolled steel plate or stainless steel plate).

In combustion chamber 60, in the end part situated on the side of top plate part 21, second pad member 80 is disposed. Second pad member 80 has a substantially disc-like shape, and is disposed in abutment with filter 90 and top plate part 21 to cover the boundary part between filter 90 and top plate part 21. As a result, in the vicinity of the end part of combustion chamber 60, second pad member 80 is situated between top plate part 21 and gas generating agent 61.

Second pad member 80 has a bottom part 81 which is in abutment with top plate part 21, and an abutting part 82 standing from the periphery of bottom part 81. Abutting part 82 is in abutment with the inner circumferential face of the axial end part situated on the side of top plate part 21 of filter 90.

Second pad member 80 is outflow preventing means for preventing the gas generated in combustion chamber 60 from flowing out from the gap between the upper end of filter 90 and top plate part 21 without flowing inside filter 90, in actuation. Likewise first pad member 70, second pad member 80 is formed, for example, by pressing a plate-like member made of metal, and is preferably formed of a member formed of a steel plate of common steel or special steel (for example, cold-rolled steel plate or stainless steel plate).

In second pad member 80, a cushion member 85 of an annular shape is disposed in contact with gas generating agent 61 accommodated in combustion chamber 60. As a result, cushion member 85 is situated between top plate part 21 and gas generating agent 61 in the part on the side of top plate part 21 of combustion chamber 60, and pushes gas generating agent 61 toward bottom plate part 11. Cushion member 85 is provided to prevent gas generating agent 61 formed of a compact from being crushed by vibration or the like, and is preferably made up of a member formed of a compact of ceramic fiber, rock wool, foamed plastics (such as foamed silicone, for example).

As described above, in the present embodiment, cup-shaped member 50 is fixed to bottom plate part 11 mainly by first pad member 70. In the following, the assembling structure thereof will be specifically described.

As shown in FIG. 1 and FIG. 2, first extension part 53 provided in cup-shaped member 50 extends along the inner bottom face of bottom plate part 11 so as to have a substantially S-shaped section, from the open end side of lateral wall part 52, and its tip part 54 reaches the part where projecting cylindrical part 13 of bottom plate part 11 is not formed. On the other hand, second extension part 71 provided in first pad member 70 extends along the inner bottom face of bottom plate part 11 so as to have a substantially L-shaped section, from the lower end part of abutting part 72, and its tip part 73 reaches the part of bottom plate part 11 where projecting cylindrical part 13 is formed (more specifically, the outer circumferential face situated inside the housing of projecting cylindrical part 13).

Tip part 54 of first extension part 53 is disposed between bottom plate part 11 and second extension part 71 along the axial direction of the housing, and as a result, it is sandwiched and retained by bottom plate part 11 and second extension part 71 along the axial direction of the housing. Therefore, cup-shaped member 50 is fixed to bottom plate part 11 in the condition that tip part 54 of its first extension part 53 is pushed toward bottom plate part 11 by second extension part 71 of first pad member 70.

Here, since first pad member 70 is in the condition of being pushed toward bottom plate part 11 by gas generating agent 61, cushion member 85, second pad member 80 and top plate part 21 disposed thereabove, first pad member 70 is also fixed inside the housing, and hence cup-shaped member 50 is prevented from falling off bottom plate part 11 without use of swaging fixation or press-fit fixation for fixation of cup-shaped member 50. Therefore, it becomes possible to securely fix cup-shaped member 50 to bottom plate part 11.

In the present embodiment, press-fit fixation to retainer 30 is achieved by fitting a part on the open end side of lateral wall part 52 of cup-shaped member 50 outside inner covering part 31 which is situated inside the housing of retainer 30. This press-fit fixation is conducted for temporarily fixing cup-shaped member 50 to facilitate the operation of assembling cup-shaped member 50 to the housing, and is different from the aforementioned conventionally conducted press-fit fixation that requires strict management of the assembling strength.

Figure 6:
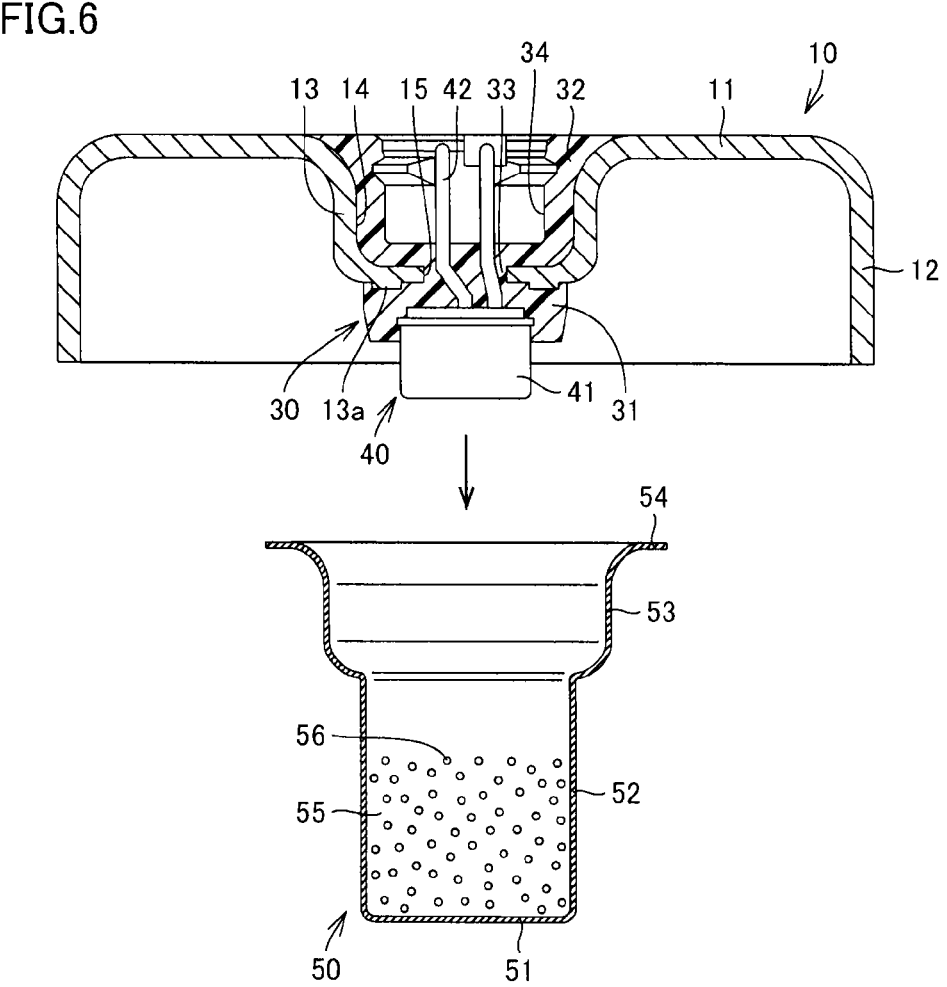
FIG. 6 is a schematic sectional view for illustrating an assembling process of the gas generator shown in FIG. 1.
Figure 7:
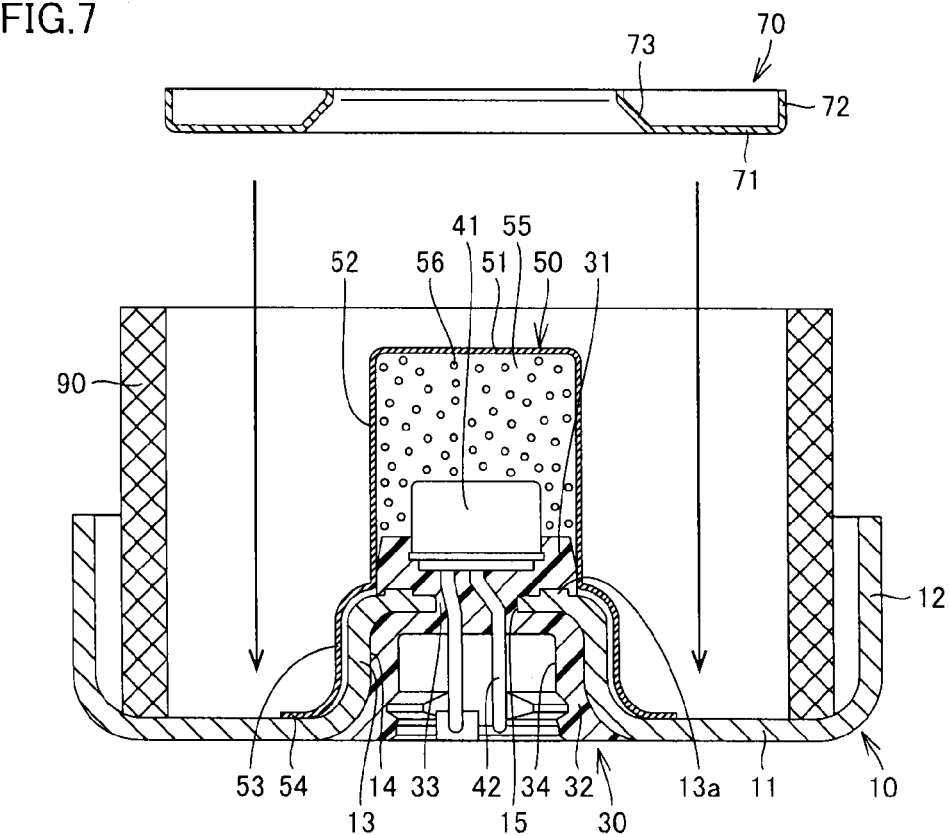
FIG. 7 is a schematic sectional view for illustrating an assembling process of the gas generator shown in FIG. 1.

FIG. 6 and FIG. 7 are schematic sectional views for illustrating an assembling process of a gas generator in the present embodiment. Next, referring to FIG. 6 and FIG. 7, an assembling process of gas generator 1A in the present embodiment will be described.

In assembling gas generator 1A, lower shell 10 that is produced by press molding, and igniter 40 that is previously produced are set in a mold for injection molding, and injection molding is conducted in this condition to form retainer 30 which is a resin molded part in bottom plate part 11 of lower shell 10, and thus igniter 40 is fixed to projecting cylindrical part 13 of lower shell 10.

Next, as shown in FIG. 6, cup-shaped member 50 that is previously produced by press molding is packed with a predetermined amount of transfer charge 56, and the part in the vicinity of projecting cylindrical part 13 of lower shell 10 in the condition that igniter 40 is fixed is inserted into cup-shaped member 50 from the open end side of cup-shaped member 50. Here, this insertion is conducted in the condition that both of cup-shaped member 50 and lower shell 10 are upside down for the purpose of preventing transfer charge 56 from spilling out.

At this time, the part on the open end side of lateral wall part 52 of cup-shaped member 50 is press-fitted in inner covering part 31 of retainer 30. As a result, cup-shaped member 50 is temporarily fixed to lower shell 10 by being lightly retained by retainer 30.

Next, as shown in FIG. 7, lower shell 10 in the condition that cup-shaped member 50 is lightly retained is turned upside down, and in this condition, filter 90 is placed on lower shell 10, and thereafter first pad member 70 is inserted into the space defined by lower shell 10 and filter 90.

As a result, second extension part 71 of first pad member 70 is disposed on tip part 54 of first extension part 53 of cup-shaped member 50, and tip part 54 of first extension part 53 is sandwiched between second extension part 71 and bottom plate part 11 along the axial direction of the housing.

Here, by lightly retaining cup-shaped member 50 by press-fitting into retainer 30 as described above, it is possible to prevent cup-shaped member 50 from falling off when lower shell 10 is turned upside down, and the operation is facilitated.

Next, the space that is defined by lower shell 10 and filter 90 and is situated above first pad member 70 is packed with a predetermined amount of gas generating agent 61, and then second pad member 80 into which cushion member 85 is fitted is disposed on gas generating agent 61, and then upper shell 20 is assembled to cover lower shell 10 and joined with lower shell 10 to complete production of gas generator 1A.

With gas generator 1A in the present embodiment, it is possible to fix cup-shaped member 50 to lower shell 10 securely, and to easily fix cup-shaped member 50 to lower shell 10 by a simple assembling operation.

Next, referring to FIG. 1, operation of gas generator 1A in the aforementioned present embodiment will be described.

At the time of a collision of a vehicle equipped with gas generator 1A in the present embodiment, the collision is detected by collision detecting means that is separately provided in the vehicle, and based on this detection, a control unit that is separately provided in the vehicle turns on electricity to actuate igniter 40. Transfer charge 56 accommodated in transfer charge chamber 55 is ignited and combusted by a flame occurring by actuation of igniter 40 to generate a large quantity of thermoparticulates. Combustion of transfer charge 56 causes rupture or melting of cup-shaped member 50, and the aforementioned thermoparticulates flow into combustion chamber 60.

The inflow thermoparticulates ignite gas generating agent 61 accommodated in combustion chamber 60 to combust, to generate a large quantity of gas. The gas generated in combustion chamber 60 passes inside filter 90 where the gas is cooled by removal of heat by filter 90 and slag contained in the gas is removed by filter 90, and the gas then flows into the outer peripheral part of the housing.

As the internal pressure of the housing increases, the sealing by sealing tape 24 having closed gas discharge opening 23 of upper shell 20 is broken, and the gas is ejected outside the housing through gas discharge opening 23. The ejected gas is introduced inside an air bag provided adjacent to gas generator 1A to expand and develop the air bag.

As described in the above, with gas generator 1A in the present embodiment, it becomes possible to assemble cup-shaped member 50 accommodating transfer charge 56 to the housing securely and easily without use of swaging fixation. Therefore, an additional operation for achieving the swaging fixation, for example, providing the housing with a collar part for swaging is not required, so that it is possible to produce gas generator 1A at a low cost.

Also with gas generator 1A in the present embodiment, it is possible to assemble cup-shaped member 50 accommodating transfer charge 56 to the housing securely and easily without use of press-fit fixation that requires strict management of the assembling strength. Therefore, the necessity of strict management of the assembling strength will not occur, and a problem of buckling or the like when an enhancer cup having low mechanical strength is used as cup-shaped member 50 will not occur, so that it is possible to produce gas generator 1A at a low cost.

Here, with gas generator 1A in the present embodiment, as shown in FIG. 2, tip part 54 of first extension part 53 of cup-shaped member 50 is interposed between second extension part 71 of first pad member 70 and bottom plate part 11 of lower shell 10. Therefore, by appropriately adjusting the length along the radial direction of first extension part 53, a space 62 where first extension part 53 is not situated is formed between second extension part 71 and bottom plate part 11. In other words, with gas generator 1A in the present embodiment, it is possible to form space 62 formed of an air layer in the end part on the side of bottom plate part 11 of combustion chamber 60.

Since space 62 functions as a heat-insulating layer in autoignition operation, it can take an important role in an aspect of safety. Hereinafter, this point will be described in detail.

Autoignition operation means an unscheduled operation in which a gas generating agent is combusted without actuation of an igniter. That is, when a fire or the like occurs in a vehicle or the like equipped with an air-bag device incorporating a gas generator, the internal temperature of the gas generator can rise up to several hundred degrees Celsius due to external heating of the gas generator. In such a case, when the temperature of the gas generating agent or the transfer charge reaches the autoignition temperature, the gas generating agent starts combustion without actuation of the igniter, and this operation is called autoignition.

When such autoignition operation is induced, the internal pressure of the housing can rise to a pressure much higher than the pressure required at the time of actuation of the igniter as described above due to combustion of the gas generating agent because the gas generator is already at high temperature due to heating from outside, and this can undesirably cause breakage of the housing. When such a breakage occurs in the housing, broken pieces and internal constituting parts will scatter circumferentially, to result in serious problem in an aspect of safety.

For this reason, it is important to configure the gas generator so that autoignition operation is executed safely even when such autoignition operation is induced. As one measure for this, it is conceivable to configure the gas generator so that transfer charge starts combustion at relatively low temperatures by spontaneous ignition prior to the gas generating agent in the case of a fire of a vehicle or the like. With this configuration, autoignition operation starts before such a problematic high temperature condition is reached in the case of a fire of a vehicle or the like, so that it becomes possible to prevent the housing from breaking.

In gas generator 1A in the present embodiment, since space 62 formed of an air layer is formed in an end part on the side of bottom plate part 11 of combustion chamber 60 as described above, this part functions as a heat insulating layer, and the external heat is prevented from being transferred to gas generating agent 61. On the other hand, regarding cup-shaped member 50, since cup-shaped member 50 is in contact with bottom plate part 11 of lower shell 10 particularly when it is formed of a metallic member, external heat is transferred more quickly by transfer charge 56 via cup-shaped member 50.

Therefore, by employing this configuration, external heat is more likely to be transferred to transfer charge 56 than to gas generating agent 61 in the case of a fire of a vehicle or the like, so that transfer charge 56 spontaneously ignites and starts combustion at relatively low temperature prior to gas generating agent 61. Therefore, even when autoignition operation is induced, the operation is executed more safely, and gas generator 1A superior in an aspect of safety is achieved.

In the present embodiment, the case where space 62 is formed by configuring tip part 54 of cup-shaped member 50 not to reach the inner circumferential face of filter 90 is exemplified; however, tip part 54 of cup-shaped member 50 may reach the inner circumferential face of filter 90 to avoid formation of space 62. With such a configuration, the heat insulating function by space 62 is not obtained; however, by forming cup-shaped member 50 of a resin member, for example, cup-shaped member 50 itself functions as a heat insulating material, and a gas generator with improved safety is achieved.

First Modified Example

Figure 8:
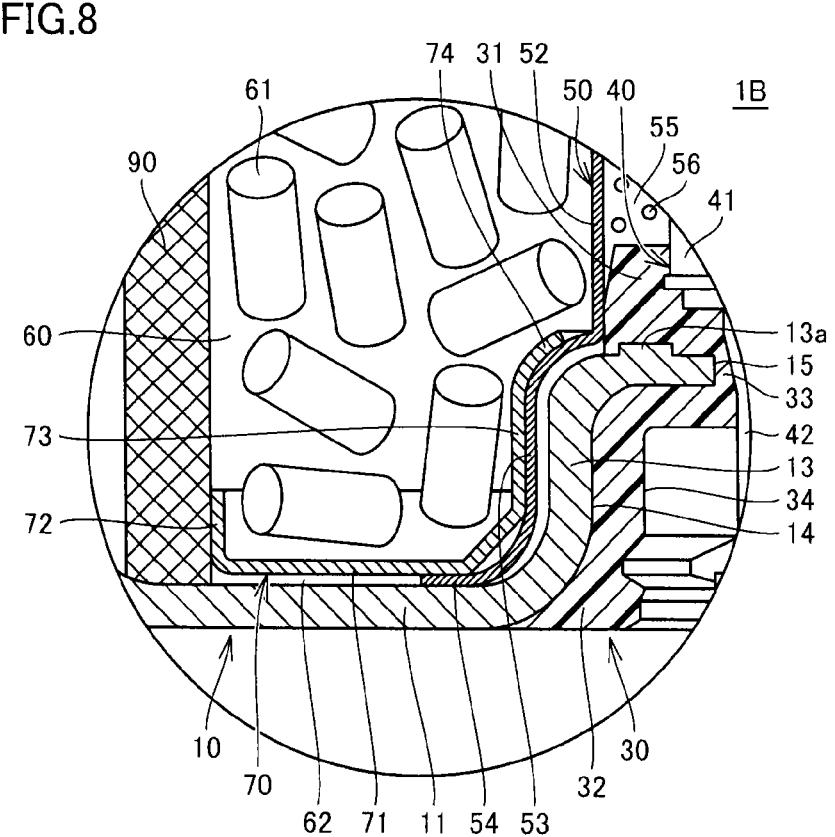
FIG. 8 is an enlarged schematic sectional view of an essential part of a gas generator according to a first modified example.

FIG. 8 is an enlarged schematic sectional view of an essential part of a gas generator according to a first modified example based on Embodiment 1 of the present invention. Next, referring to FIG. 8, a gas generator 1B according to the first modified example will be described.

As shown in FIG. 8, gas generator 1B according to the first modified example differs from gas generator 1A in Embodiment 1 only in the shape of first pad member 70.

Concretely, in gas generator 1B, second extension part 71 of first pad member 70 extends farther inwardly in the radial direction compared with Embodiment 1 described above. As a result, second extension part 71 has tip part 73 situated facing the outer circumferential face of projecting cylindrical part 13 of bottom plate part 11, and a tip curved part 74 formed with curvature to reach a farther inward part in the radial direction than tip part 73. Tip curved part 74 reaches the position in the vicinity of the axial end part of projecting cylindrical part 13 of bottom plate part 11, and also in that part, first extension part 53 of cup-shaped member 50 is sandwiched between bottom plate part 11 and second extension part 71 along the axial direction of the housing.

Therefore, similar effects to those described in Embodiment 1 can be obtained also with gas generator 1B according to the first modified example.

Second Modified Example

Figure 9:
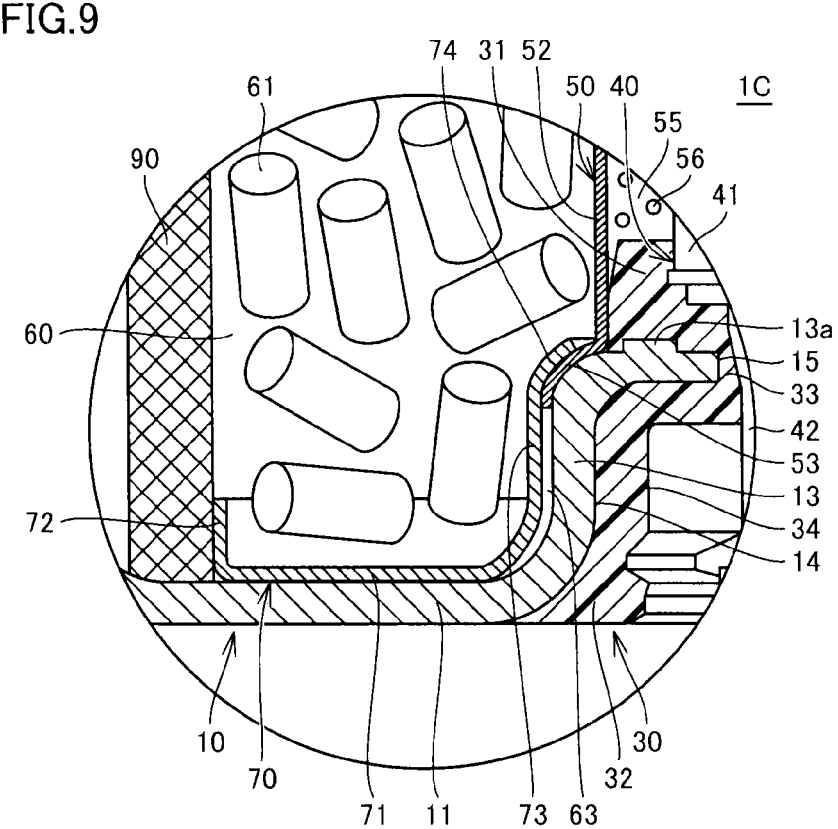
FIG. 9 is an enlarged schematic sectional view of an essential part of a gas generator according to a second modified example.

FIG. 9 is an enlarged schematic sectional view of an essential part of a gas generator according to a second modified example based on Embodiment 1 of the present invention. Next, referring to FIG. 9, a gas generator 1C according to the second modified example will be described.

As shown in FIG. 9, gas generator 1C according to the second modified example differs from gas generator 1B according to the first modified example as described above only in the shape of cup-shaped member 50.

Concretely, in gas generator 1C, first extension part 53 of cup-shaped member 50 is shorter in the radial direction compared with the case of the first modified example, and it merely reaches to the position close to the upper end of outer circumferential face of projecting cylindrical part 13 of bottom plate part 11. However, also in this case, since first extension part 53 is disposed between projecting cylindrical part 13 of bottom plate part 11 and tip curved part 74 of first pad member 70 along the axial direction of the housing, first extension part 53 is sandwiched and retained between bottom plate part 11 and second extension part 71 along the axial direction of the housing.

Therefore, similar effects to those by gas generator 1B of the first modified example described above can be obtained also with gas generator 1C according to the second modified example.

Here, in gas generator 1C according to the second modified example, since a part of bottom plate part 11 where projecting cylindrical part 13 is not formed, and second extension part 71 of first pad member 70 are in abutment with each other, space 62 (see FIG. 2 and FIG. 8) as described above is not formed therebetween. However, since a space 63 is formed between the part of bottom plate part 11 where projecting cylindrical part 13 is formed, and tip part 73 of first pad member 70, space 63 functions as a heat insulating layer, and safety at the time of autoignition operation is further improved.

Third Modified Example

Figure 10:
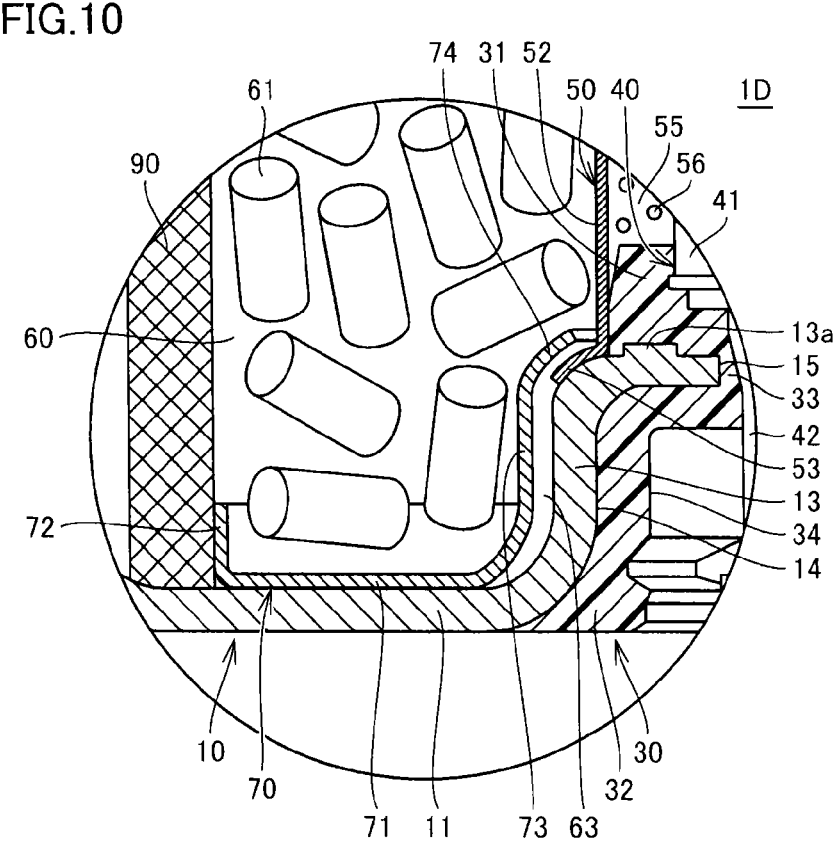
FIG. 10 is an enlarged schematic sectional view of an essential part of a gas generator according to a third modified example.

FIG. 10 is an enlarged schematic sectional view of an essential part of a gas generator according to a third modified example based on Embodiment 1 of the present invention. Next, referring to FIG. 10, a gas generator 1D according to the third modified example will be described.

As shown in FIG. 10, gas generator 1D according to the third modified example differs from gas generator 1C according to the second modified example as described above only in that tip curved part 74 of first pad member 70 is not in abutment with first extension part 53 of cup-shaped member 50. In other words, in the third modified example, a gap is formed between tip curved part 74 and first extension part 53.

However, also in this case, since first extension part 53 is disposed between projecting cylindrical part 13 of bottom plate part 11 and tip curved part 74 of first pad member 70 along the axial direction of the housing, movement of cup-shaped member 50 along the axial direction of the housing is restricted by tip curved part 74 and projecting cylindrical part 13. Therefore, by appropriately adjusting the size of the gap, it is possible to adequately prevent cup-shaped member 50 from falling off bottom plate part 11 although cup-shaped member 50 is not perfectly fixed to bottom plate part 11. Therefore, also in the case of employing this configuration, it is possible to securely assemble cup-shaped member 50 to bottom plate part 11.

Therefore, similar effects to those by gas generator 1C of the second modified example described above can be obtained by gas generator 1D according to the third modified example.

Fourth Modified Example

Figure 11:
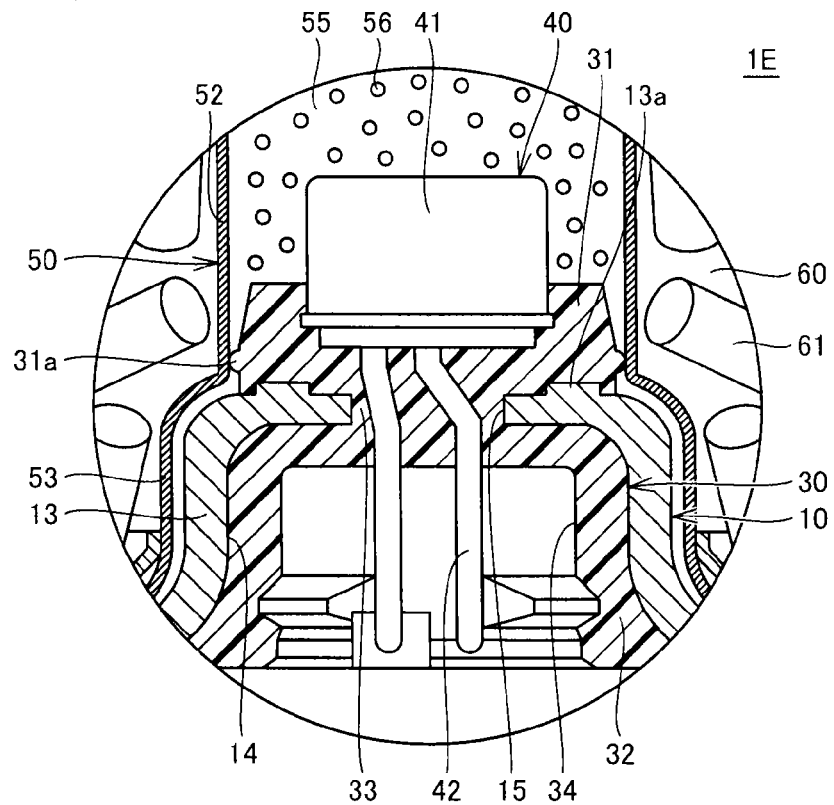
FIG. 11 is an enlarged schematic sectional view of an essential part of a gas generator according to a fourth modified example.

FIG. 11 is an enlarged schematic sectional view of an essential part of a gas generator according to a fourth modified example based on Embodiment 1 of the present invention. Next, referring to FIG. 11, a gas generator 1E according to the fourth modified example will be described.

As shown in FIG. 11, gas generator 1E according to the fourth modified example differs from gas generator 1A in the Embodiment 1 described above only in the shape of inner covering part 31 of retainer 30.

Concretely, in gas generator 1E, a first projection part 31a is provided on the outer circumferential face of inner covering part 31 situated inside the housing of retainer 30, and in the part where first projection part 31a is provided, cup-shaped member 50 is press-fitted into retainer 30.

Here, first projection part 31a may be provided continuously along the circumferential direction on the outer circumferential face of inner covering part 31 having a substantially cylindrical shape, or may be provided in the form of a plurality of segments along the circumferential direction. When first projection part 31a is provided in the form of a plurality of segments, it is preferred to appropriately adjust the size of a gap occurring between the inner circumferential face of cup-shaped member 50 and the outer circumferential face of inner covering part 31 in the part where first projection part 31a is not formed, to prevent transfer charge 56 from spilling out through the gap. For example, when transfer charge 56 has a long substantially cylindrical contour, the size of the gap is preferably smaller than the axial length of transfer charge 56, and more preferably smaller than the diameter of transfer charge 56.

With gas generator 1E according to the fourth modified example, not only similar effects to those described in Embodiment 1 are obtained, but also further facilitation of assembling operation is achieved because resistance in press-fitting cup-shaped member 50 into retainer 30 is reduced, and thus cup-shaped member 50 can be press-fitted into retainer 30 more smoothly.

Fifth Modified Example

Figure 12:
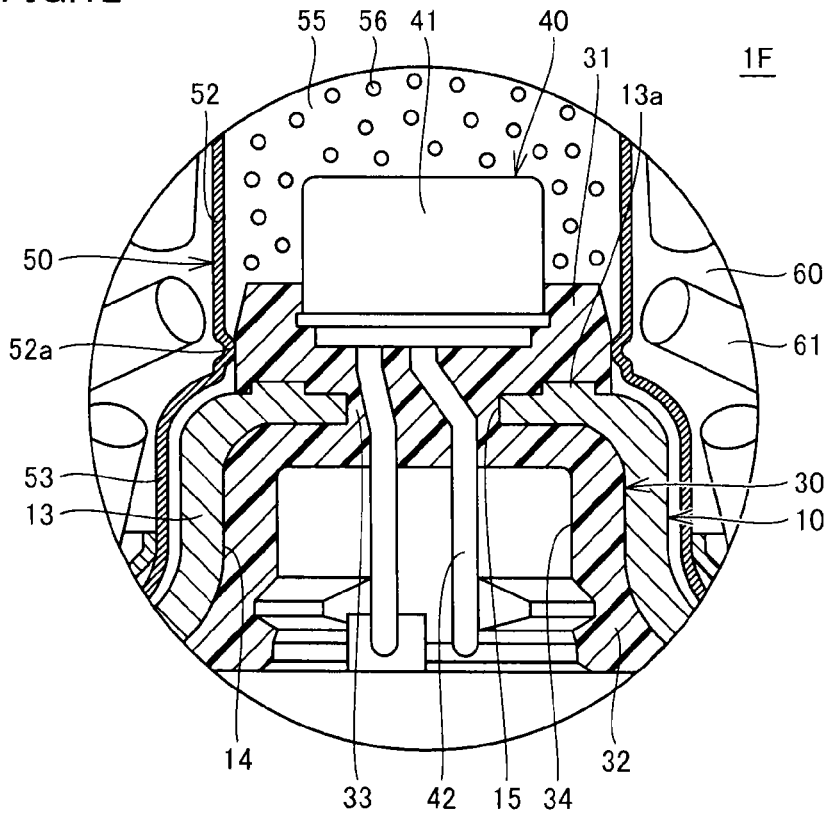
FIG. 12 is an enlarged schematic sectional view of an essential part of a gas generator according to a fifth modified example.

FIG. 12 is an enlarged schematic sectional view of an essential part of a gas generator according to a fifth modified example based on Embodiment 1 of the present invention. Next, referring to FIG. 12, a gas generator 1F according to the fifth modified example will be described.

As shown in FIG. 12, gas generator 1F according to the fifth modified example differs from gas generator 1A in Embodiment 1 described above only in the shape of lateral wall part 52 of cup-shaped member 50.

Concretely, in gas generator 1F, a first projection part 52a projecting inwardly along the circumferential direction at a predetermined position of lateral wall part 52 of cup-shaped member 50 is provided, and in the part where first projection part 52a is provided, cup-shaped member 50 is press-fitted into retainer 30.

Here, first projection part 52a may be provided continuously along the circumferential direction on the inner circumferential face of lateral wall part 52 having a substantially cylindrical shape, or may be provided in the form of a plurality of segments along the circumferential direction. When first projection part 52a is provided in the form of a plurality of segments, it is preferred to appropriately adjust the size of a gap occurring between the inner circumferential face of lateral wall part 52 in the part where first projection part 52a is not formed and the outer circumferential face of inner covering part 31 of retainer 30, to prevent transfer charge 56 from spilling out through the gap.

With gas generator 1F according to the fifth modified example, not only similar effects to those described in Embodiment 1 are obtained, but also further facilitation of assembling operation is achieved because resistance in press-fitting cup-shaped member 50 into retainer 30 is reduced, and thus cup-shaped member 50 can be press-fitted into retainer 30 more smoothly.

Embodiment 2

Figure 13:
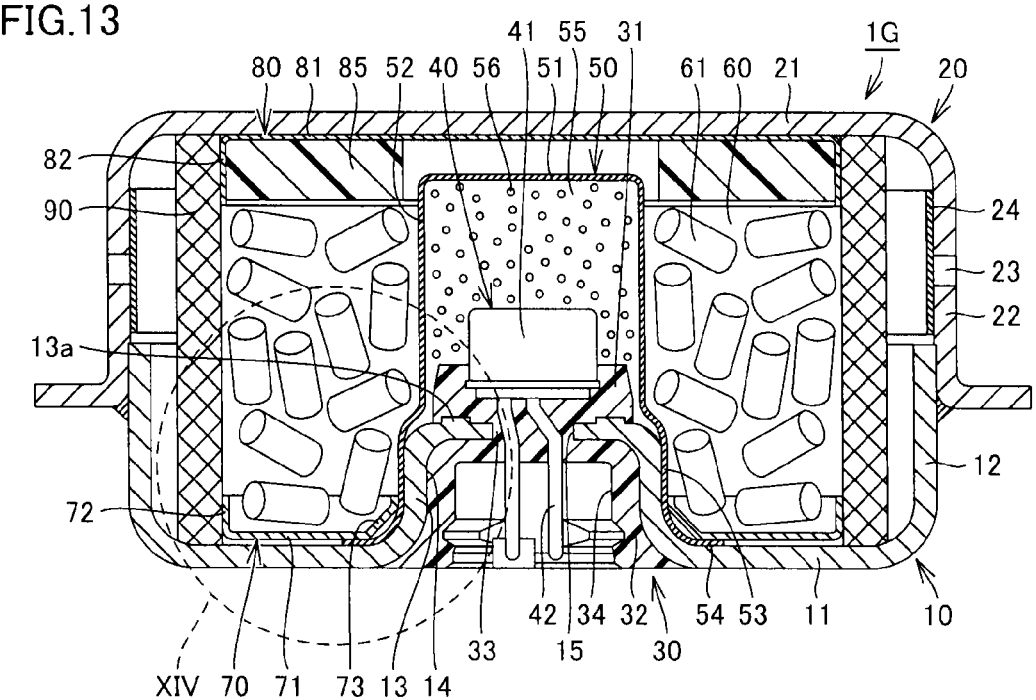
FIG. 13 is a schematic view of a gas generator in Embodiment 2 of the present invention.
Figure 14:
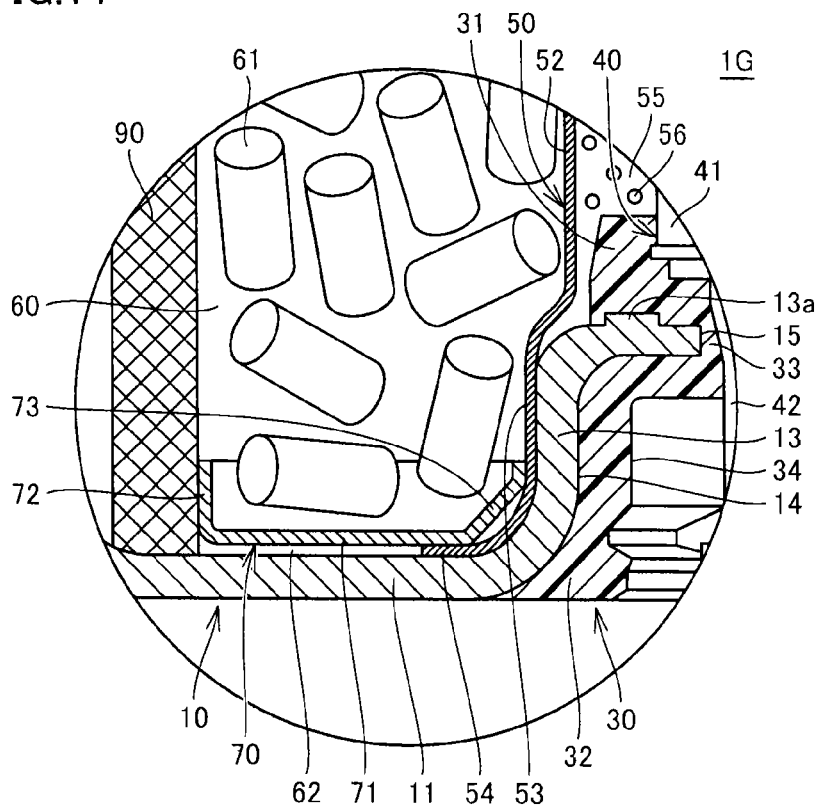
FIG. 14 is an enlarged schematic sectional view of an essential part of the gas generator shown in FIG. 14.

FIG. 13 is a schematic view of a gas generator in Embodiment 2 of the present invention, and FIG. 14 is an enlarged schematic sectional view of an essential part of region XIV shown in FIG. 13 of the gas generator shown in FIG. 13. Hereinafter, referring to FIG. 13 and FIG. 14, a gas generator 1G in Embodiment 2 of the present invention will be described.

As shown in FIG. 13 and FIG. 14, gas generator 1G in the present embodiment has almost identical configurations regarding various constituting parts including cup-shaped member 50 and first pad member 70 to those of gas generator 1A in Embodiment 1 described above, and differs from gas generator 1A in Embodiment 1 described above only in that cup-shaped member 50 is not fixed to retainer 30 by press-fitting, but is fixed to projecting cylindrical part 13 provided in bottom plate part 11 of lower shell 10 by press-fitting.

Concretely, in gas generator 1G, first extension part 53 of cup-shaped member 50 is fitted over projecting cylindrical part 13 of bottom plate part 11, and thus press-fitted with respect to projecting cylindrical part 13. This press-fit fixation is conducted for temporarily fixing cup-shaped member 50 to facilitate the operation of assembling cup-shaped member 50 to the housing, and is different from the aforementioned conventionally conducted press-fit fixation that requires strict management of the assembling strength.

Here, also in gas generator 1G of the present embodiment, first extension part 53 provided in cup-shaped member 50 extends along the inner bottom face of bottom plate part 11 so as to have a substantially S-shaped section, from the open end side of lateral wall part 52, and tip part 54 thereof reaches the part of bottom plate part 11 where projecting cylindrical part 13 is not formed. On the other hand, second extension part 71 provided in first pad member 70 extends along the inner bottom face of bottom plate part 11 so as to have a substantially L-shaped section, from the lower end part of abutting part 72, and its tip part 73 reaches the part of bottom plate part 11 where projecting cylindrical part 13 is formed (more specifically, the outer circumferential face situated inside the housing of projecting cylindrical part 13).

Tip part 54 of first extension part 53 is disposed between bottom plate part 11 and second extension part 71 along the axial direction of the housing, and as a result, tip part 54 is sandwiched and retained by bottom plate part 11 and second extension part 71 along the axial direction of the housing. Therefore, cup-shaped member 50 is fixed to bottom plate part 11 in the condition that tip part 54 of its first extension part 53 is pushed toward bottom plate part 11 by second extension part 71 of first pad member 70.

Therefore, also with gas generator 1G in the present embodiment, it is possible to obtain similar effects to those described in Embodiment 1 described above, and to assemble cup-shaped member 50 accommodating transfer charge 56 to the housing securely and easily without use of swaging fixation or press-fit fixation that requires strict management of the assembling strength, and to produce gas generator 1G at a low cost.

Sixth Modified Example

Figure 15:
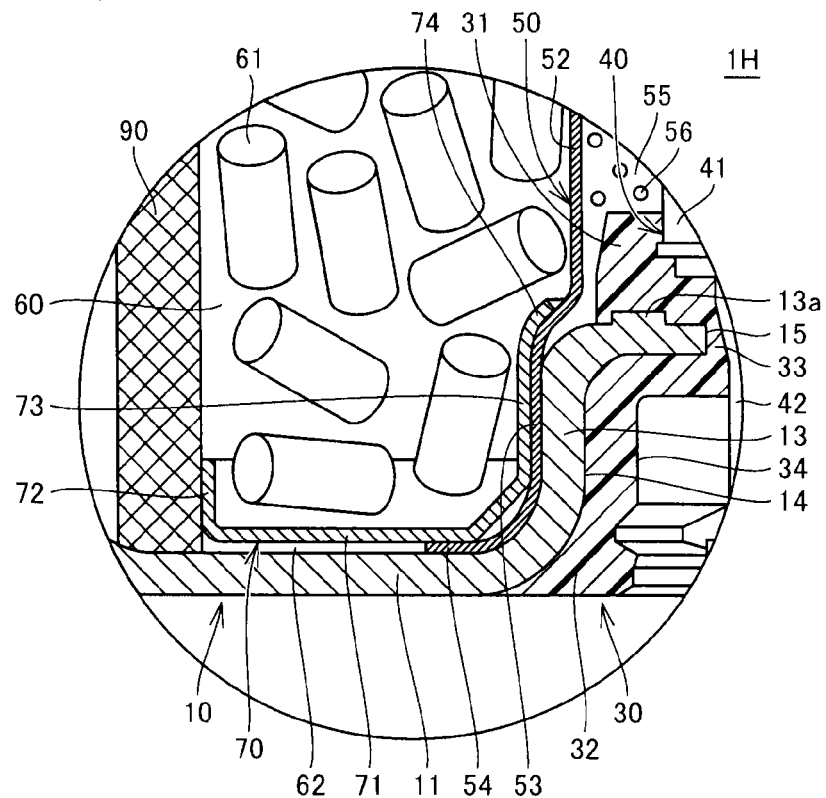
FIG. 15 is an enlarged schematic sectional view of an essential part of a gas generator according to a sixth modified example.

FIG. 15 is an enlarged schematic sectional view of an essential part of a gas generator according to a sixth modified example based on Embodiment 2 of the present invention. Next, referring to FIG. 15, a gas generator 1H according to the sixth modified example will be described.

As shown in FIG. 15, gas generator 1H according to the sixth modified example differs from gas generator 1G in Embodiment 2 described above only in the shape of first pad member 70.

Concretely, in gas generator 1H, second extension part 71 of first pad member 70 extends farther inwardly in the radial direction compared with Embodiment 2 described above. As a result, second extension part 71 has tip part 73 situated facing the outer circumferential face of projecting cylindrical part 13 of bottom plate part 11, and a tip curved part 74 formed with curvature to reach a farther inward part in the radial direction than tip part 73. Tip curved part 74 reaches the position in the vicinity of the axial end part of projecting cylindrical part 13 of bottom plate part 11, and also in that part, first extension part 53 of cup-shaped member 50 is sandwiched between bottom plate part 11 and second extension part 71 along the axial direction of the housing.

Therefore, similar effects to those described in Embodiment 2 can be obtained also with gas generator 1H according to the sixth modified example.

Seventh Modified Example

Figure 16:
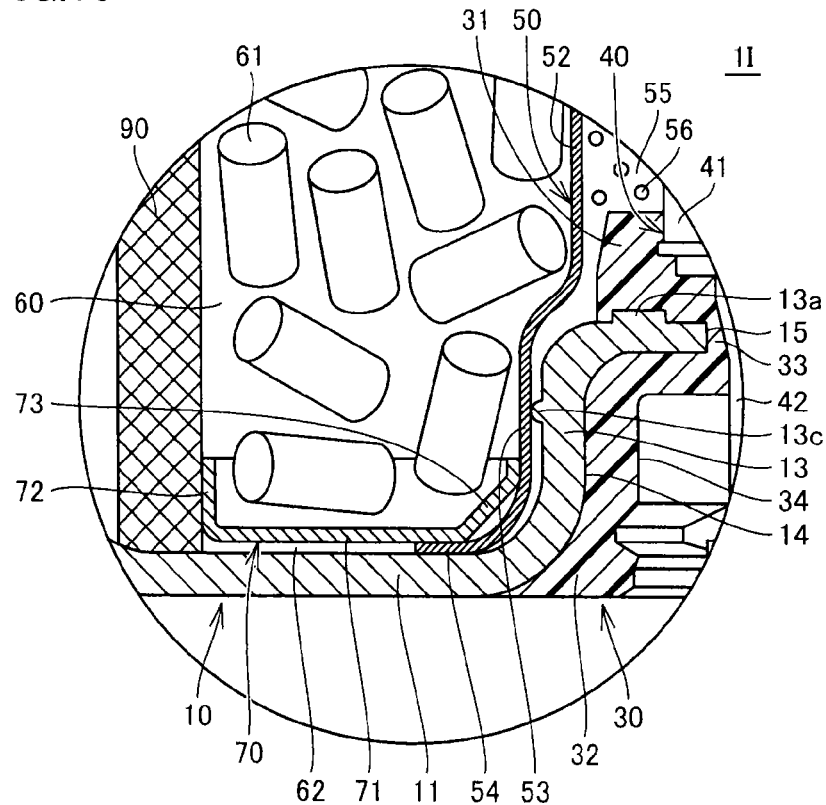
FIG. 16 is an enlarged schematic sectional view of an essential part of a gas generator according to a seventh modified example.

FIG. 16 is an enlarged schematic sectional view of an essential part of a gas generator according to a seventh modified example based on Embodiment 2 of the present invention. Next, referring to FIG. 16, a gas generator 1I according to the seventh modified example will be described.

As shown in FIG. 16, gas generator 1I according to the seventh modified example differs from gas generator 1G in Embodiment 2 described above only in the shape of projecting cylindrical part 13 of lower shell 10.

Concretely, in gas generator 1I, a second projection part 13c is provided on the outer circumferential face of projecting cylindrical part 13 provided in bottom plate part 11, and in the part where second projection part 13c is provided, cup-shaped member 50 is press-fitted into projecting cylindrical part 13.

Here, second projection part 13c may be provided continuously along the circumferential direction on the outer circumferential face of projecting cylindrical part 13 having a substantially cylindrical shape, or may be provided in the form of a plurality of segments along the circumferential direction. When second projection part 13c is provided in the form of a plurality of segments, it is preferred to appropriately adjust the size of a gap occurring between the inner circumferential face of first extension part 53 of cup-shaped member 50 and the outer circumferential face of projecting cylindrical part 13 in the part where second projection part 13c is not formed, to prevent transfer charge 56 from spilling out through the gap. For example, when transfer charge 56 has a long substantially cylindrical contour, the size of the gap is preferably smaller than the axial length of transfer charge 56, and more preferably smaller than the diameter of transfer charge 56.

With gas generator 1I according to the seventh modified example, not only similar effects to those described in Embodiment 2 are obtained, but also further facilitation of assembling operation is achieved because resistance in press-fitting cup-shaped member 50 into retainer 30 is reduced, and thus cup-shaped member 50 can be press-fitted into retainer 30 more smoothly.

Eighth Modified Example

Figure 17:
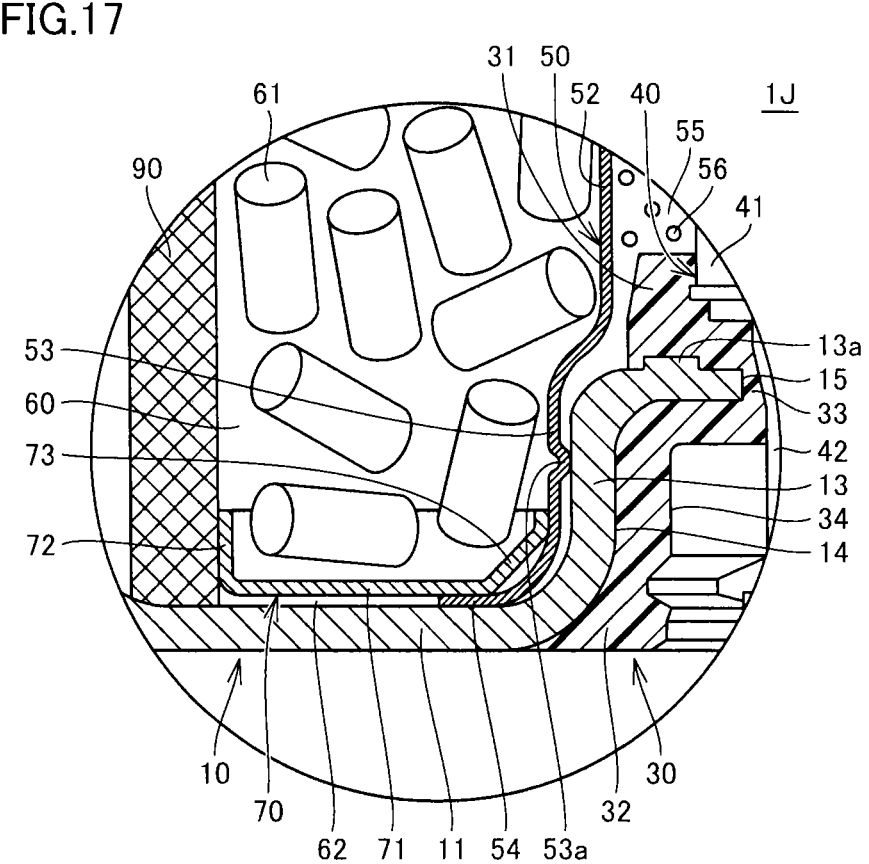
FIG. 17 is an enlarged schematic sectional view of an essential part of a gas generator according to an eighth modified example.

FIG. 17 is an enlarged schematic sectional view of an essential part of a gas generator according to an eighth modified example based on Embodiment 2 of the present invention. Next, referring to FIG. 17, a gas generator 1J according to the eighth modified example will be described.

As shown in FIG. 17, gas generator 1J according to the eighth modified example differs from gas generator 1G in Embodiment 2 described above only in the shape of first extension part 53 of cup-shaped member 50.

Concretely, in gas generator 1J, a second projection part 53a projecting inwardly along the circumferential direction at a predetermined position of first extension part 53 of cup-shaped member 50 is provided, and in the part where second projection part 53a is provided, cup-shaped member 50 is press-fitted into projecting cylindrical part 13.

Here, second projection part 53a may be provided continuously along the circumferential direction on the inner circumferential face of first extension part 53 having a substantially cylindrical shape, or may be provided in the form of a plurality of segments along the circumferential direction. When second projection part 53a is provided in the form of a plurality of segments, it is preferred to appropriately adjust the size of a gap occurring between the inner circumferential face of first extension part 53 where second projection part 53a is not formed and the outer circumferential face of projecting cylindrical part 13, to prevent transfer charge 56 from spilling out through the gap.

With gas generator 1J according to the eighth modified example, not only similar effects to those described in Embodiment 2 are obtained, but also further facilitation of assembling operation is achieved because resistance in press-fitting cup-shaped member 50 into retainer 30 is reduced, and thus cup-shaped member 50 can be press-fitted into retainer 30 more smoothly.

Embodiment 3

Figure 18:
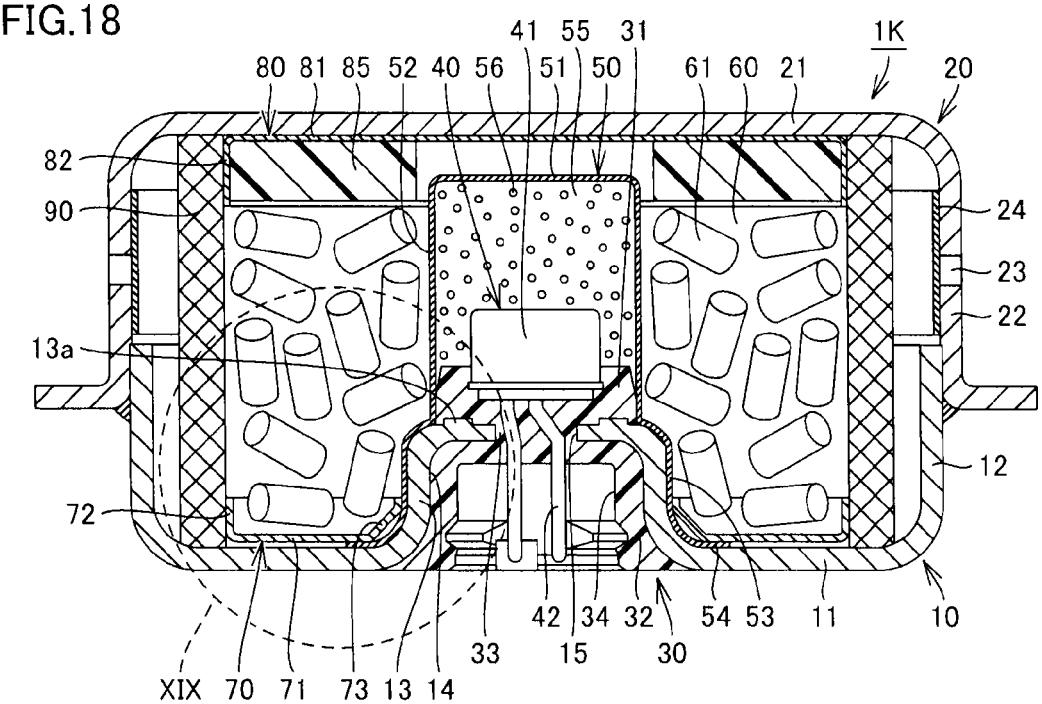
FIG. 18 is a schematic view of a gas generator in Embodiment 3 of the present invention.
Figure 19:
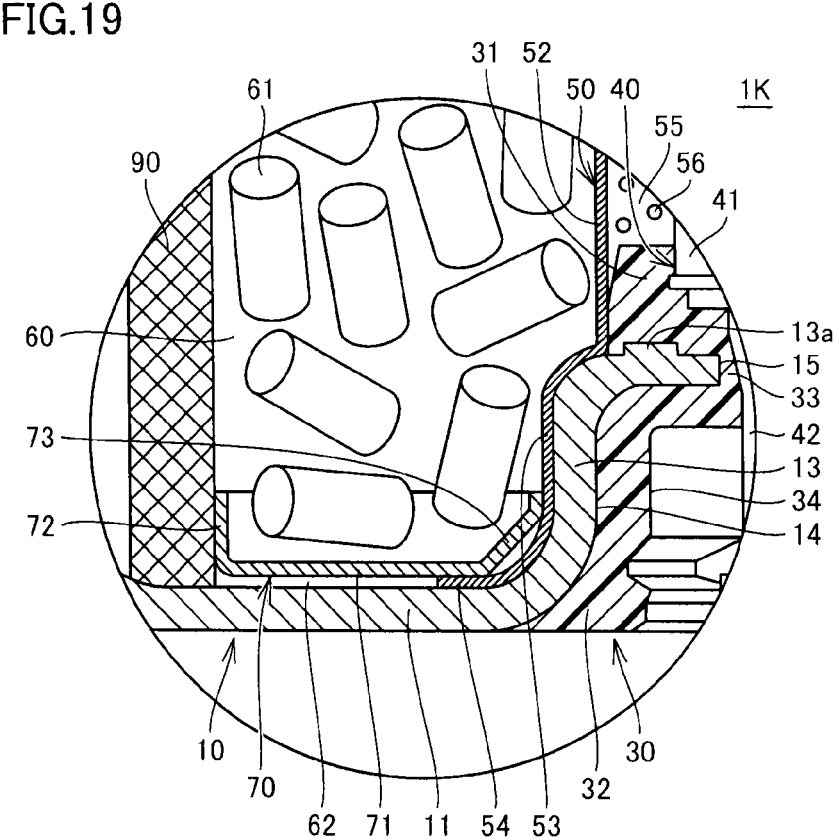
FIG. 19 is an enlarged schematic sectional view of an essential part of the gas generator shown in FIG. 18.

FIG. 18 is a schematic view of a gas generator in Embodiment 3 of the present invention, and FIG. 19 is an enlarged schematic sectional view of an essential part of region XIX shown in FIG. 18 of the gas generator shown in FIG. 18. Hereinafter, referring to FIG. 18 and FIG. 19, a gas generator 1K in Embodiment 3 of the present invention will be described.

As shown in FIG. 18 and FIG. 19, gas generator 1K in the present embodiment has almost identical configurations regarding various constituting parts including cup-shaped member 50 and first pad member 70 to those of gas generator 1A in Embodiment 1 described above, and differs from gas generator 1A in Embodiment 1 described above only in that cup-shaped member 50 is not only fixed to retainer 30 by press-fitting, but also fixed to projecting cylindrical part 13 provided in lower shell 10 by press-fitting.

Concretely, in gas generator 1K, a part on the open end side of lateral wall part 52 of cup-shaped member 50 is fitted over inner covering part 31 which is a part of retainer 30 situated inside the housing, and thus press-fitted with respect to retainer 30, and first extension part 53 of cup-shaped member 50 is fitted over projecting cylindrical part 13 of bottom plate part 11, and thus press-fitted with respect to projecting cylindrical part 13. Both of these press-fit fixations are conducted for temporarily fixing cup-shaped member 50 to facilitate the operation in assembling cup-shaped member 50 to the housing, and are different from the aforementioned conventionally conducted press-fit fixation that requires strict management of the assembling strength.

Here, also in gas generator 1K of the present embodiment, first extension part 53 provided in cup-shaped member 50 extends along the inner bottom face of bottom plate part 11 so as to have a substantially S-shaped section, from the open end side of lateral wall part 52, and tip part 54 thereof reaches the part of bottom plate part 11 where projecting cylindrical part 13 is not formed. On the other hand, second extension part 71 provided in first pad member 70 extends along the inner bottom face of bottom plate part 11 so as to have a substantially L-shaped section, from the lower end part of abutting part 72, and its tip part 73 reaches the part of bottom plate part 11 where projecting cylindrical part 13 is formed (more specifically, the outer circumferential face situated inside the housing of projecting cylindrical part 13).

Tip part 54 of first extension part 53 is disposed between bottom plate part 11 and second extension part 71 along the axial direction of the housing, and as a result, tip part 54 is sandwiched and retained by bottom plate part 11 and second extension part 71 along the axial direction of the housing. Therefore, cup-shaped member 50 is fixed to bottom plate part 11 in the condition that tip part 54 of its first extension part 53 is pushed toward bottom plate part 11 by second extension part 71 of first pad member 70.

Therefore, also with gas generator 1K in the present embodiment, it is possible to obtain similar effects to those described in Embodiment 1 described above, and to assemble cup-shaped member 50 accommodating transfer charge 56 to the housing securely and easily without use of swaging fixation or press-fit fixation that requires strict management of the assembling strength, and to produce gas generator 1K at a low cost.

Ninth Modified Example

Figure 20:
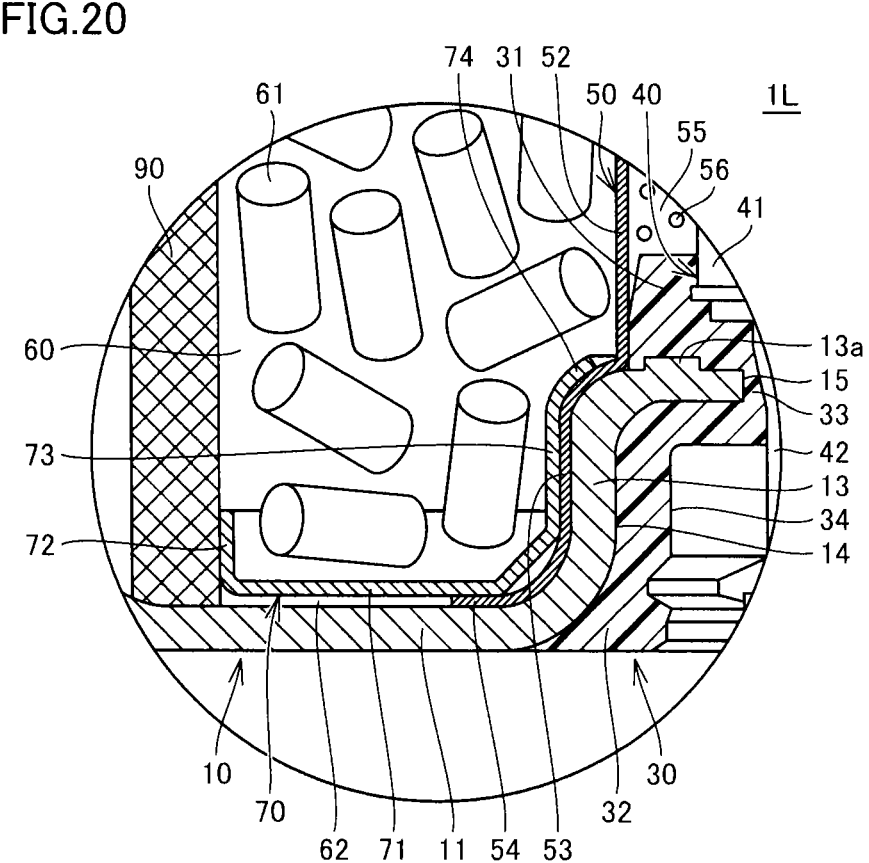
FIG. 20 is an enlarged schematic sectional view of an essential part of a gas generator according to a ninth modified example.

FIG. 20 is an enlarged schematic sectional view of an essential part of a gas generator according to a ninth modified example based on Embodiment 3 of the present invention. Next, referring to FIG. 20, a gas generator 1L according to the ninth modified example will be described.

As shown in FIG. 20, gas generator 1L according to the ninth modified example differs from gas generator 1K in Embodiment 3 described above only in the shape of first pad member 70.

Concretely, in gas generator 1L, second extension part 71 of first pad member 70 extends farther inwardly in the radial direction compared with Embodiment 3 described above. As a result, second extension part 71 has tip part 73 situated facing the outer circumferential face of projecting cylindrical part 13 of bottom plate part 11, and a tip curved part 74 formed with curvature to reach a farther inward part in the radial direction than tip part 73. Tip curved part 74 reaches the position in the vicinity of the axial end part of projecting cylindrical part 13 of bottom plate part 11, and also in that part, first extension part 53 of cup-shaped member 50 is sandwiched between bottom plate part 11 and second extension part 71 along the axial direction of the housing.

Therefore, similar effects to those described in Embodiment 3 can be obtained also with gas generator 1L according to the ninth modified example.

Embodiment 4

Figures 21, 22:
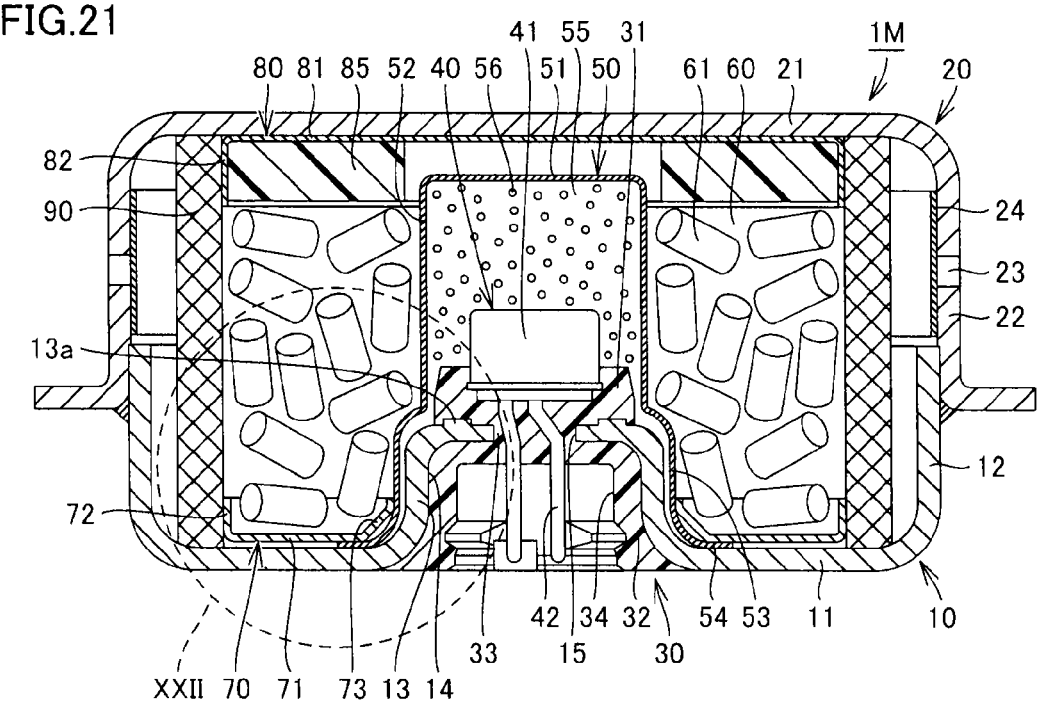
FIG. 21 is a schematic view of a gas generator in Embodiment 4 of the present invention.
FIG. 22 is an enlarged schematic sectional view of an essential part of the gas generator shown in FIG. 21.

FIG. 21 is a schematic view of a gas generator in Embodiment 4 of the present invention, and FIG. 22 is an enlarged schematic sectional view of an essential part of region XXII shown in FIG. 21 of the gas generator shown in FIG. 21. Hereinafter, referring to FIG. 21 and FIG. 22, a gas generator 1M in Embodiment 4 of the present invention will be described.

As shown in FIG. 21 and FIG. 22, gas generator 1M in the present embodiment has almost identical configurations regarding various constituting parts including cup-shaped member 50 and first pad member 70 to those of gas generator 1A in Embodiment 1 described above, and differs from gas generator 1A in Embodiment 1 described above only in that cup-shaped member 50 is not fixed to retainer 30 by press-fitting fixation.

Here, also in gas generator 1M of the present embodiment, first extension part 53 provided in cup-shaped member 50 extends along the inner bottom face of bottom plate part 11 so as to have a substantially S-shaped section, from the open end side of lateral wall part 52, and tip part 54 thereof reaches the part of bottom plate part 11 where projecting cylindrical part 13 is not formed. On the other hand, second extension part 71 provided in first pad member 70 extends along the inner bottom face of bottom plate part 11 so as to have a substantially L-shaped section, from the lower end part of abutting part 72, and its tip part 73 reaches the part of bottom plate part 11 where projecting cylindrical part 13 is formed (more specifically, the outer circumferential face situated inside the housing of projecting cylindrical part 13).

Tip part 54 of first extension part 53 is disposed between bottom plate part 11 and second extension part 71 along the axial direction of the housing, and as a result, tip part 54 is sandwiched and retained by bottom plate part 11 and second extension part 71 along the axial direction of the housing. Therefore, cup-shaped member 50 is fixed to bottom plate part 11 in the condition that tip part 54 of its first extension part 53 is pushed toward bottom plate part 11 by second extension part 71 of first pad member 70.

Therefore, also with gas generator 1M in the present embodiment, it is possible to obtain similar effects to those described in Embodiment 1 described above, and to assemble cup-shaped member 50 accommodating transfer charge 56 to the housing securely and easily without use of swaging fixation or press-fit fixation that requires strict management of the assembling strength, and to produce gas generator 1M at a low cost.

In the case of gas generator 1M in the present embodiment, since cup-shaped member 50 is not press-fitted to any of retainer 30 and lower shell 10 at the time of assembling cup-shaped member 50, temporary fixation by press-fitting cannot be achieved. However, if cup-shaped member 50 is pushed against lower shell 10 using a jig or the like, lower shell 10 can be easily turned upside down without spilling of transfer charge 56, and this configuration will not complicate the production.

Tenth Modified Example

Figure 23:
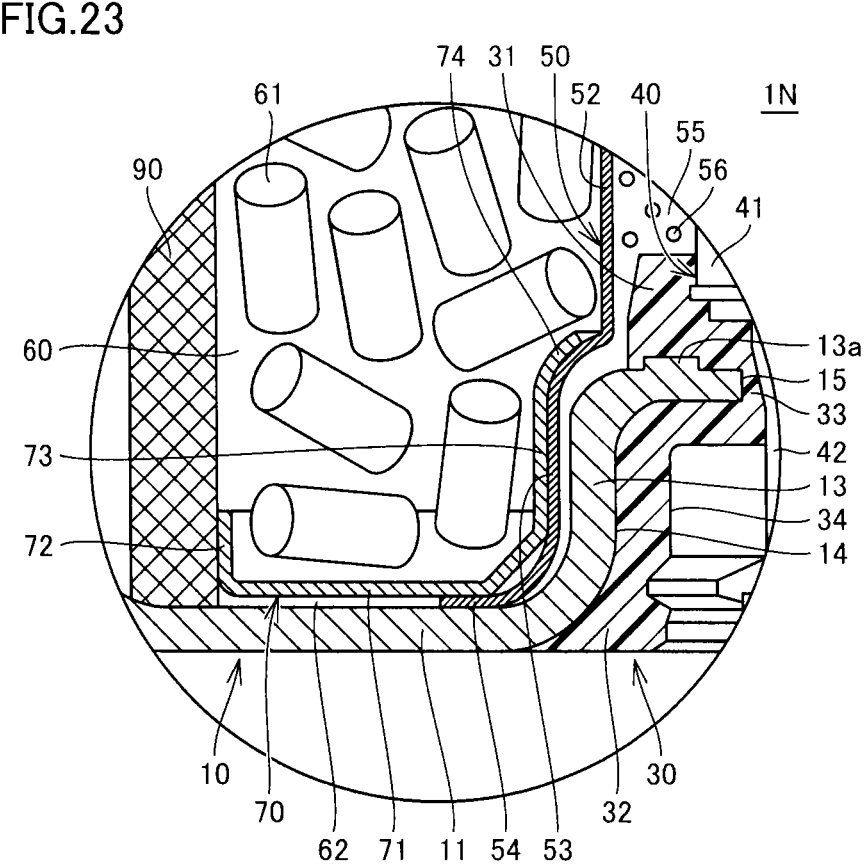
FIG. 23 is an enlarged schematic sectional view of an essential part of a gas generator according to a tenth modified example.

FIG. 23 is an enlarged schematic sectional view of an essential part of a gas generator according to a tenth modified example based on Embodiment 4 of the present invention. Next, referring to FIG. 23, a gas generator 1N according to the tenth modified example will be described.

As shown in FIG. 23, gas generator 1N according to the tenth modified example differs from gas generator 1M in Embodiment 4 described above only in the shape of first pad member 70.

Concretely, in gas generator 1N, second extension part 71 of first pad member 70 extends farther inwardly in the radial direction compared with Embodiment 4 described above. As a result, second extension part 71 has tip part 73 situated facing the outer circumferential face of projecting cylindrical part 13 of bottom plate part 11, and a tip curved part 74 formed with curvature to reach a farther inward part in the radial direction than tip part 73. Tip curved part 74 reaches the position in the vicinity of the axial end part of projecting cylindrical part 13 of bottom plate part 11, and also in that part, first extension part 53 of cup-shaped member 50 is sandwiched between bottom plate part 11 and second extension part 71 along the axial direction of the housing.

Therefore, similar effects to those described in Embodiment 4 can be obtained also with gas generator 1N according to the tenth modified example.

Embodiment 5

Figure 24:
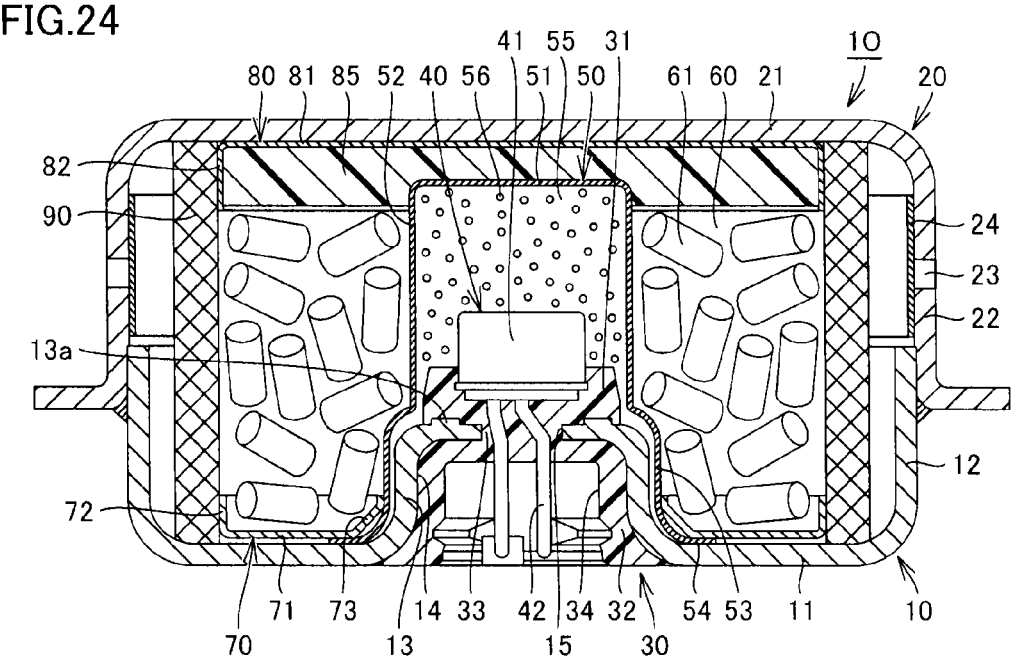
FIG. 24 is a schematic view of a gas generator in Embodiment 5 of the present invention.

FIG. 24 is a schematic view of a gas generator in Embodiment 5 of the present invention. Hereinafter, referring to FIG. 24, a gas generator 1O in Embodiment 5 of the present invention will be described.

As shown in FIG. 24, gas generator 1O in the present embodiment has almost identical configurations to those of gas generator 1M in Embodiment 4 described above, and differs from gas generator 1M in Embodiment 4 only in that cup-shaped member 50 is further fixed to bottom plate part 11 by cushion member 85 disposed on the side of top plate part 21 of combustion chamber 60.

Concretely, in gas generator 1O, cushion member 85 has a disc-like shape, and cushion member 85 is disposed to cover not only the end part on the side of top plate part 21 of combustion chamber 60 accommodating gas generating agent 61, but also top wall part 51 of cup-shaped member 50. Here, cushion member 85 is compressed by being in abutment with top wall part 51 of cup-shaped member 50, and as a result, cup-shaped member 50 is pressed toward bottom plate part 11 and fixed.

Here, also in gas generator 1O in the present embodiment, first extension part 53 provided in cup-shaped member 50 extends along the inner bottom face of bottom plate part 11 so as to have a substantially S-shaped section, from the open end side of lateral wall part 52, and its tip part 54 reaches the part where projecting cylindrical part 13 of bottom plate part 11 is not formed. On the other hand, second extension part 71 provided in first pad member 70 extends along the inner bottom face of bottom plate part 11 so as to have a substantially L-shaped section, from the lower end part of abutting part 72, and its tip part 73 reaches the part of bottom plate part 11 where projecting cylindrical part 13 is formed (more specifically, the outer circumferential face situated inside the housing of projecting cylindrical part 13).

Tip part 54 of first extension part 53 is disposed between bottom plate part 11 and second extension part 71 along the axial direction of the housing, and as a result, tip part 54 is sandwiched and retained by bottom plate part 11 and second extension part 71 along the axial direction of the housing. Therefore, cup-shaped member 50 is fixed to bottom plate part 11 in the condition that tip part 54 of its first extension part 53 is pushed toward bottom plate part 11 by second extension part 71 of first pad member 70.

Therefore, also with gas generator 1O in the present embodiment, it is possible to obtain similar effects to those described in Embodiment 4 described above, and to assemble cup-shaped member 50 accommodating transfer charge 56 to the housing securely and easily without use of swaging fixation or press-fit fixation that requires strict management of the assembling strength, and to produce gas generator 1O at a low cost. Further, since cup-shaped member 50 is fixed to bottom plate part 11 also by cushion member 85, more stable fixation can be achieved.

Embodiment 6

Figure 25:
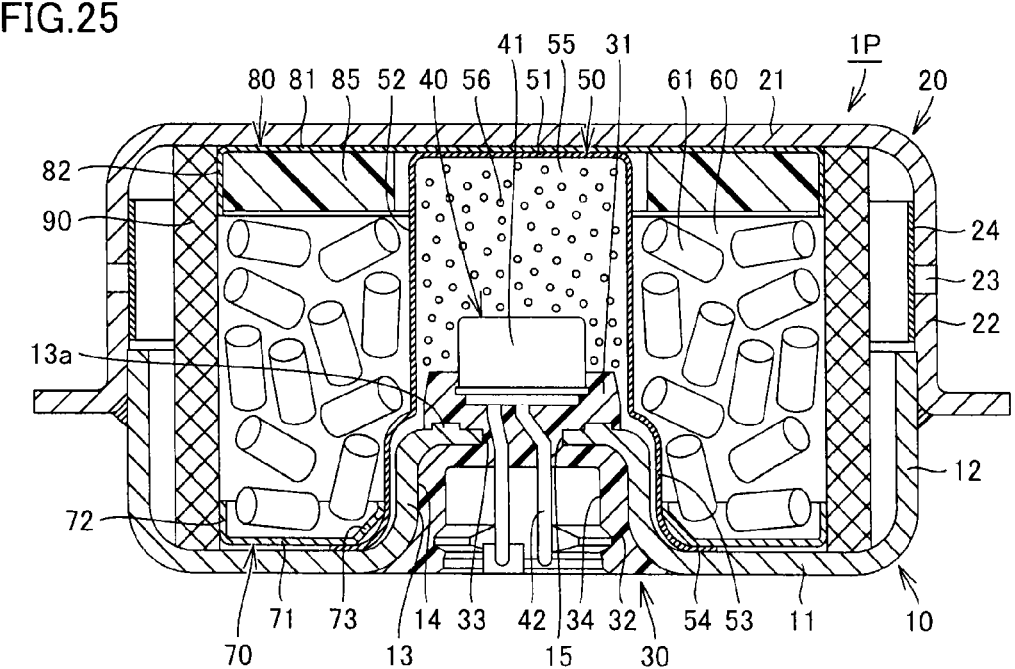
FIG. 25 is a schematic view of a gas generator in Embodiment 6 of the present invention.

FIG. 25 is a schematic view of a gas generator according to Embodiment 6 of the present invention. Hereinafter, referring to FIG. 25, a gas generator 1P in Embodiment 6 of the present invention will be described.

As shown in FIG. 25, gas generator 1P in the present embodiment has almost identical configurations to those of gas generator 1M in Embodiment 4 described above, and differs from gas generator 1M in Embodiment 4 described above only in that cup-shaped member 50 is further fixed to bottom plate part 11 by second pad member 80 disposed on the side of top plate part 21 of combustion chamber 60.

Concretely, in gas generator 1P, bottom part 81 of second pad member 80 is disposed in abutment with top wall part 51 of cup-shaped member 50, and thus cup-shaped member 50 is pushed toward bottom plate part 11 and fixed.

Here, also in gas generator 1P of the present embodiment, first extension part 53 provided in cup-shaped member 50 extends along the inner bottom face of bottom plate part 11 so as to have a substantially S-shaped section, from the open end side of lateral wall part 52, and tip part 54 thereof reaches the part of bottom plate part 11 where projecting cylindrical part 13 is not formed. On the other hand, second extension part 71 provided in first pad member 70 extends along the inner bottom face of bottom plate part 11 so as to have a substantially L-shaped section, from the lower end part of abutting part 72, and its tip part 73 reaches the part of bottom plate part 11 where projecting cylindrical part 13 is formed (more specifically, the outer circumferential face situated inside the housing of projecting cylindrical part 13).

Tip part 54 of first extension part 53 is disposed between bottom plate part 11 and second extension part 71 along the axial direction of the housing, and as a result, tip part 54 is sandwiched and retained by bottom plate part 11 and second extension part 71 along the axial direction of the housing. Therefore, cup-shaped member 50 is fixed to bottom plate part 11 in the condition that tip part 54 of its first extension part 53 is pushed toward bottom plate part 11 by second extension part 71 of first pad member 70.

Therefore, also with gas generator 1P in the present embodiment, it is possible to obtain similar effects to those described in Embodiment 4 described above, and to assemble cup-shaped member 50 accommodating transfer charge 56 to the housing securely and easily without use of swaging fixation or press-fit fixation that requires strict management of the assembling strength, and to produce gas generator 1P at a low cost. Further, since cup-shaped member 50 is fixed to bottom plate part 11 also by second pad member 80, more stable fixation can be achieved.

Embodiment 7

Figure 26:
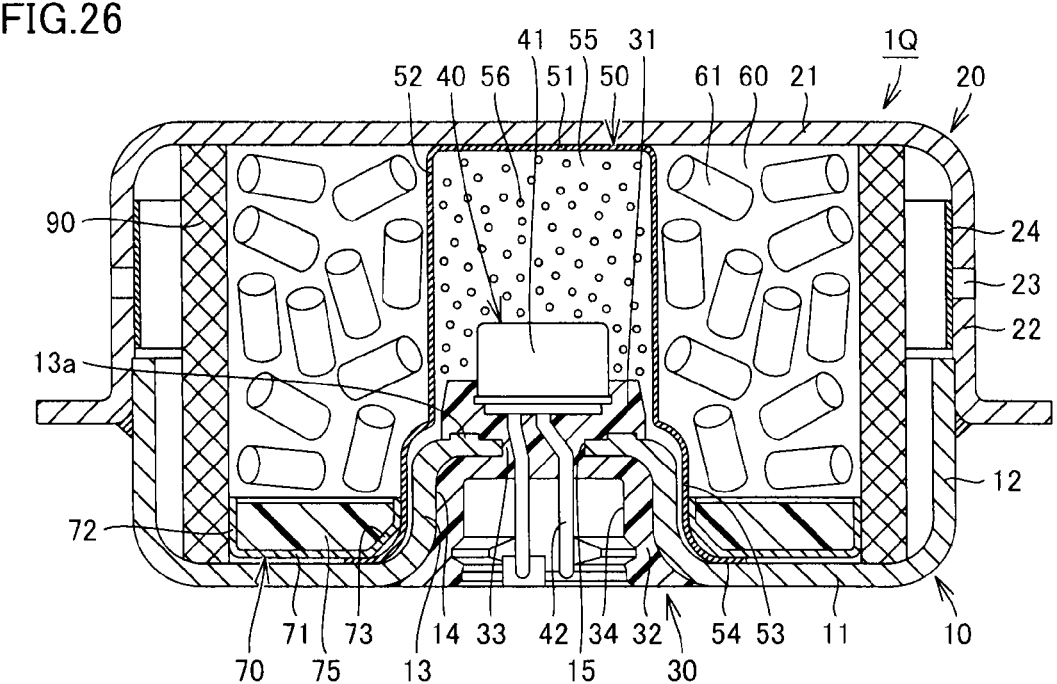
FIG. 26 is a schematic view of a gas generator in Embodiment 7 of the present invention.

FIG. 26 is a schematic view of a gas generator according to Embodiment 7 of the present invention. Hereinafter, referring to FIG. 26, a gas generator 1Q in Embodiment 7 of the present invention will be described.

As shown in FIG. 26, gas generator 1Q in the present embodiment differs from gas generator 1M in Embodiment 4 described above in the configuration of the outflow preventing means and the disposing position of the cushion member, and also differs in that cup-shaped member 50 is further fixed to bottom plate part 11 by top plate part 21.

Concretely, in gas generator 1Q, only in the vicinity of the end part situated on the side of bottom plate part 11 in combustion chamber 60, first pad member 70 is disposed as outflow preventing means for preventing gas from flowing out through the gap between filter 90 and the housing, while outflow preventing means is not particularly provided in the end part situated on the side of top plate part 21 in combustion chamber 60.

Also, in gas generator 1Q, a cushion member 75 for preventing crush of gas generating agent 61 is disposed inside first pad member 70 provided in the vicinity of the end part situated on the side of bottom plate part 11 in combustion chamber 60, but this is not provided in the end part situated on the side of top plate part 21 in combustion chamber 60.

Further, in gas generator 1Q, top plate part 21 of upper shell 20 is disposed in abutment with top wall part 51 of cup-shaped member 50, and thus cup-shaped member 50 is pushed toward bottom plate part 11 and fixed.

Here, also in gas generator 1Q of the present embodiment, first extension part 53 provided in cup-shaped member 50 extends along the inner bottom face of bottom plate part 11 so that it has a substantially S-shaped section from the open end side of lateral wall part 52, and tip part 54 thereof reaches the part of bottom plate part 11 where projecting cylindrical part 13 is not formed. On the other hand, second extension part 71 provided in first pad member 70 extends along the inner bottom face of bottom plate part 11 so as to have a substantially L-shaped section from the lower end part of abutting part 72, and its tip part 73 reaches the part of bottom plate part 11 where projecting cylindrical part 13 is formed (more specifically, the outer circumferential face situated inside the housing of projecting cylindrical part 13).

Tip part 54 of first extension part 53 is disposed between bottom plate part 11 and second extension part 71 along the axial direction of the housing, and as a result, tip part 54 is sandwiched and retained by bottom plate part 11 and second extension part 71 along the axial direction of the housing. Therefore, cup-shaped member 50 is fixed to bottom plate part 11 in the condition that tip part 54 of its first extension part 53 is pushed toward bottom plate part 11 by second extension part 71 of first pad member 70.

Therefore, also with gas generator 1Q in the present embodiment, it is possible to obtain similar effects to those described in Embodiment 4 described above, and to assemble cup-shaped member 50 accommodating transfer charge 56 to the housing securely and easily without use of swaging fixation or press-fit fixation that requires strict management of the assembling strength, and to produce gas generator 1Q at a low cost. Further, since cup-shaped member 50 is fixed to bottom plate part 11 also by top plate part 21, more stable fixation can be achieved.

Embodiment 8

Figure 27:
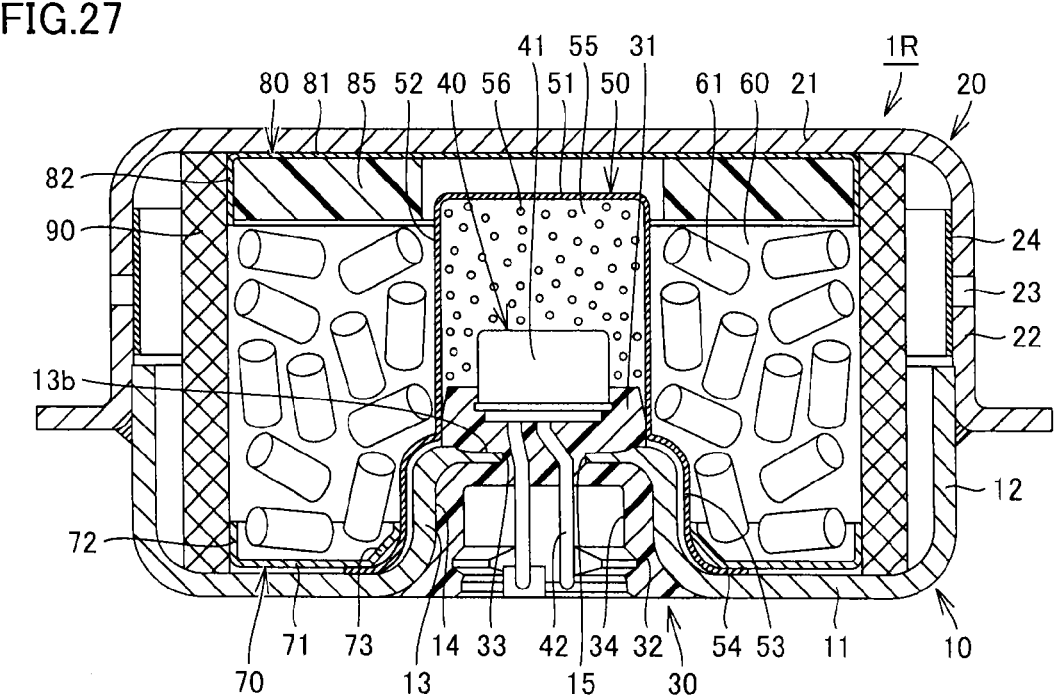
FIG. 27 is a schematic view of a gas generator in Embodiment 8 of the present invention.
Figure 28:
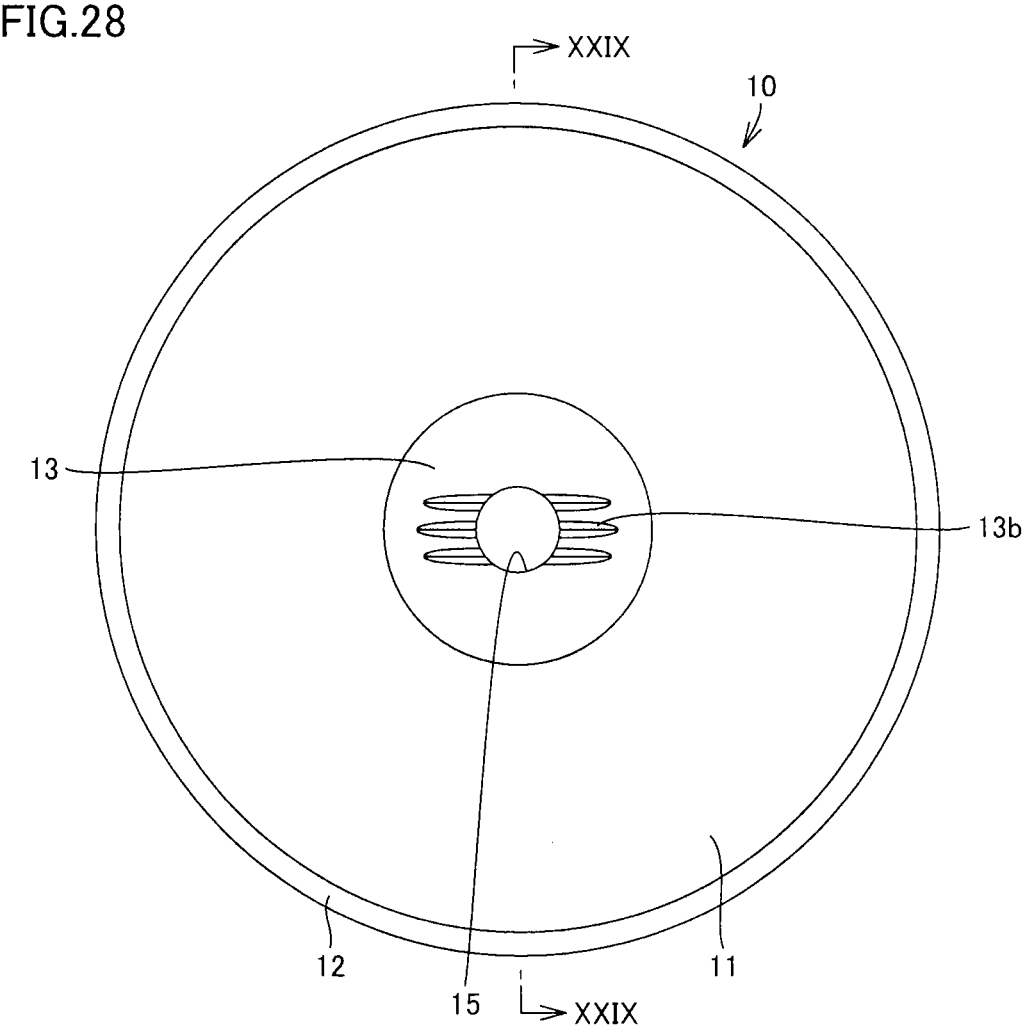
FIG. 28 is a plan view of a lower shell of the gas generator shown in FIG. 27.
Figure 29:
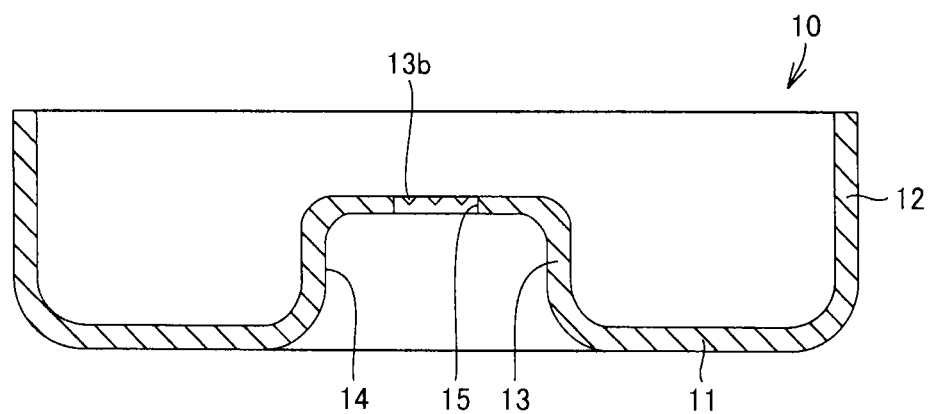
FIG. 29 is a sectional view of the lower shell of the gas generator shown in FIG. 27.

FIG. 27 is a schematic view of a gas generator in Embodiment 8 of the present invention. FIG. 28 is a plan view of a lower shell of the gas generator shown in FIG. 27, and FIG. 29 is a sectional view of the lower shell along the line XXIX-XXIX shown in FIG. 28. Hereinafter, referring to FIG. 27 to FIG. 29, a gas generator 1R in Embodiment 8 of the present invention will be described.

As shown in FIG. 27 to FIG. 29, gas generator 1R in the present embodiment slightly differs from gas generator 1A in Embodiment 1 described above in the shapes of lower shell 10 and retainer 30.

Concretely, in gas generator 1A in Embodiment 1 described above, such a configuration is exemplified that rotation of retainer 30 with respect to bottom plate part 11 after injection molding is prevented by disposing a plurality of protrusions 13a for preventing rotation at a predetermined position of lower shell 10, and forming retainer 30 formed of a resin molded part so as to cover the plurality of protrusions 13a. In contrast, in gas generator 1R in the present embodiment, rotation of retainer 30 with respect to bottom plate part 11 after injection molding is prevented by providing a plurality of recesses 13b for preventing rotation at a predetermined position of lower shell 10, and forming retainer 30 formed of a resin molded part so as to cover the plurality of recesses 13b.

More specifically, in gas generator 1R, the plurality of recesses 13b in the shape of grooves are provided in an axial end part of projecting cylindrical part 13 in the manner of interposing opening 15 provided in the axial end part, and retainer 30 is formed to cover the plurality of recesses 13b. As a result, the plurality of recesses 13b are embedded in retainer 30 by being covered by inner covering part 31 of retainer 30. With this configuration, it is possible to prevent retainer 30 from rotating relatively to bottom plate part 11 after injection molding, and the plurality of recesses 13b provided in projecting cylindrical part 13 described above function as recesses for preventing rotation.

The positions where the plurality of recesses 13b as recesses for preventing rotation are provided are not limited to the above, and may be provided in any position on the surface of bottom plate part 11 which is to be covered by retainer 30. Recess 13b as a recess for preventing rotation is not necessarily provided plurally but may be provided singly.

Here, also in gas generator 1R of the present embodiment, first extension part 53 provided in cup-shaped member 50 extends along the inner bottom face of bottom plate part 11 so as to have a substantially S-shaped section, from the open end side of lateral wall part 52, and tip part 54 thereof reaches the part of bottom plate part 11 where projecting cylindrical part 13 is not formed. On the other hand, second extension part 71 provided in first pad member 70 extends along the inner bottom face of bottom plate part 11 so that it has a substantially L-shaped section from the lower end part of abutting part 72, and its tip part 73 reaches the part of bottom plate part 11 where projecting cylindrical part 13 is formed (more specifically, the outer circumferential face situated inside the housing of projecting cylindrical part 13).

Tip part 54 of first extension part 53 is disposed between bottom plate part 11 and second extension part 71 along the axial direction of the housing, and as a result, tip part 54 is sandwiched and retained by bottom plate part 11 and second extension part 71 along the axial direction of the housing. Therefore, cup-shaped member 50 is fixed to bottom plate part 11 in the condition that tip part 54 of its first extension part 53 is pushed toward bottom plate part 11 by second extension part 71 of first pad member 70.

Therefore, also with gas generator 1R in the present embodiment, it is possible to obtain similar effects to those described in Embodiment 1 described above, and to assemble cup-shaped member 50 accommodating transfer charge 56 to the housing securely and easily without use of swaging fixation or press-fit fixation that requires strict management of the assembling strength, and to produce gas generator 1R at a low cost.

Embodiment 9

Figure 30:
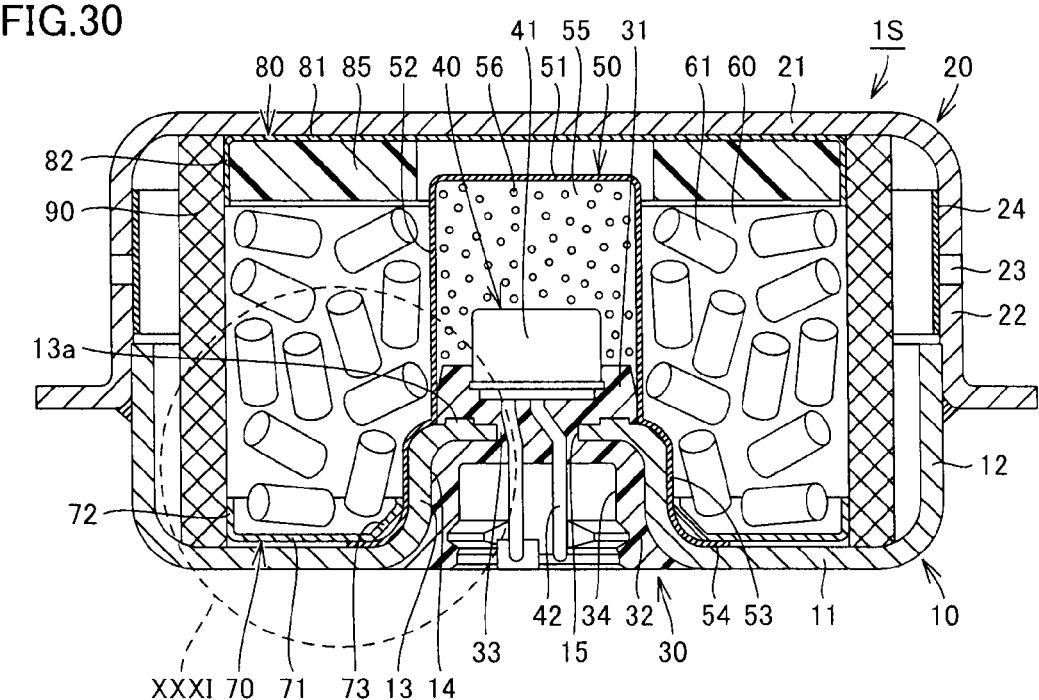
FIG. 30 is a schematic view of a gas generator in Embodiment 9 of the present invention.
Figure 31:
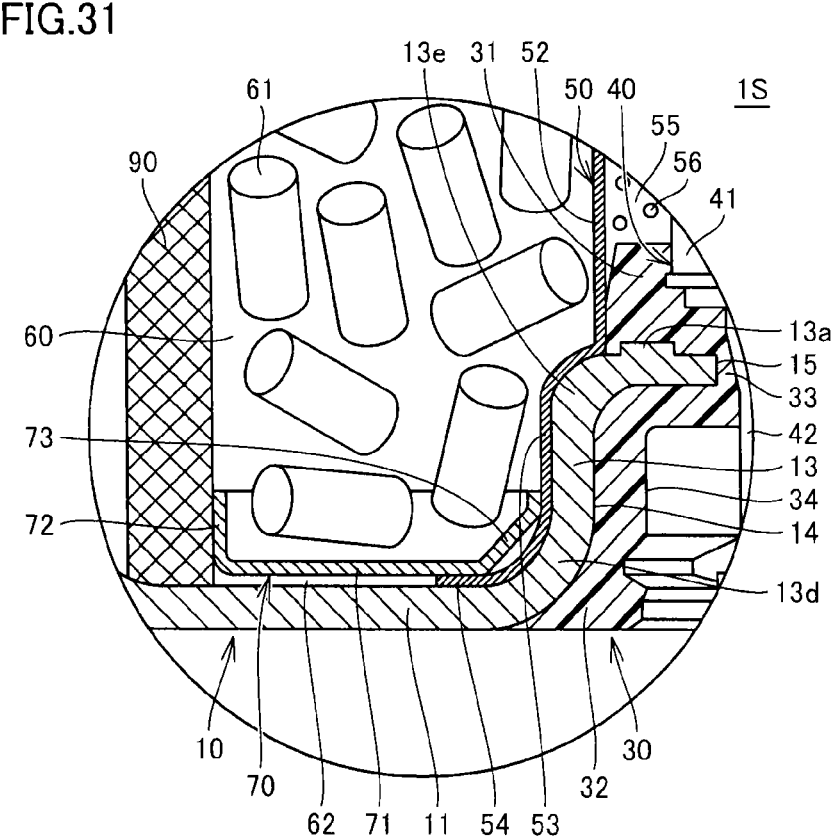
FIG. 31 is an enlarged schematic sectional view of an essential part of the gas generator shown in FIG. 30.
Figure 32:
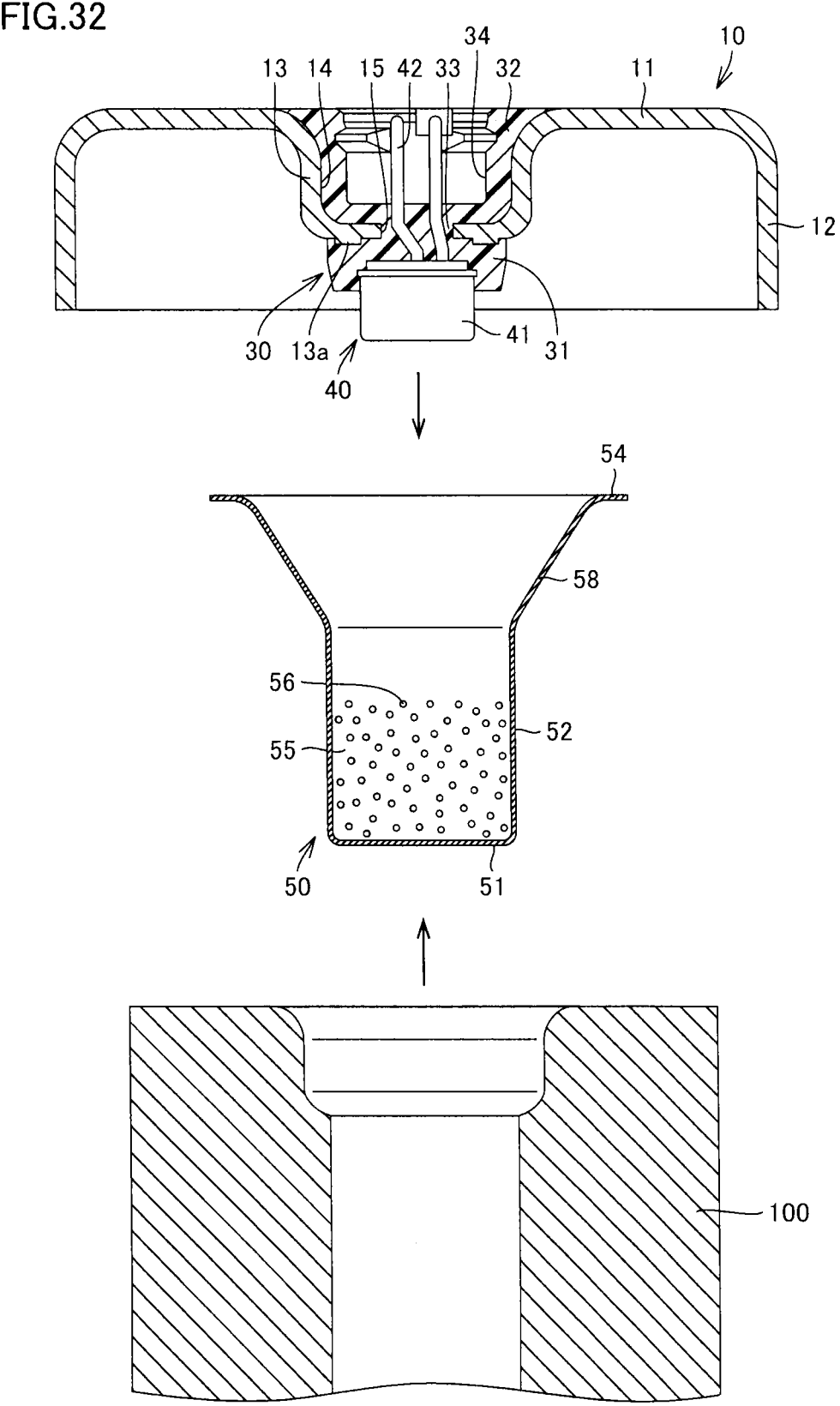
FIG. 32 is a schematic sectional view for illustrating an assembling process of the gas generator shown in FIG. 30.
Figure 33:
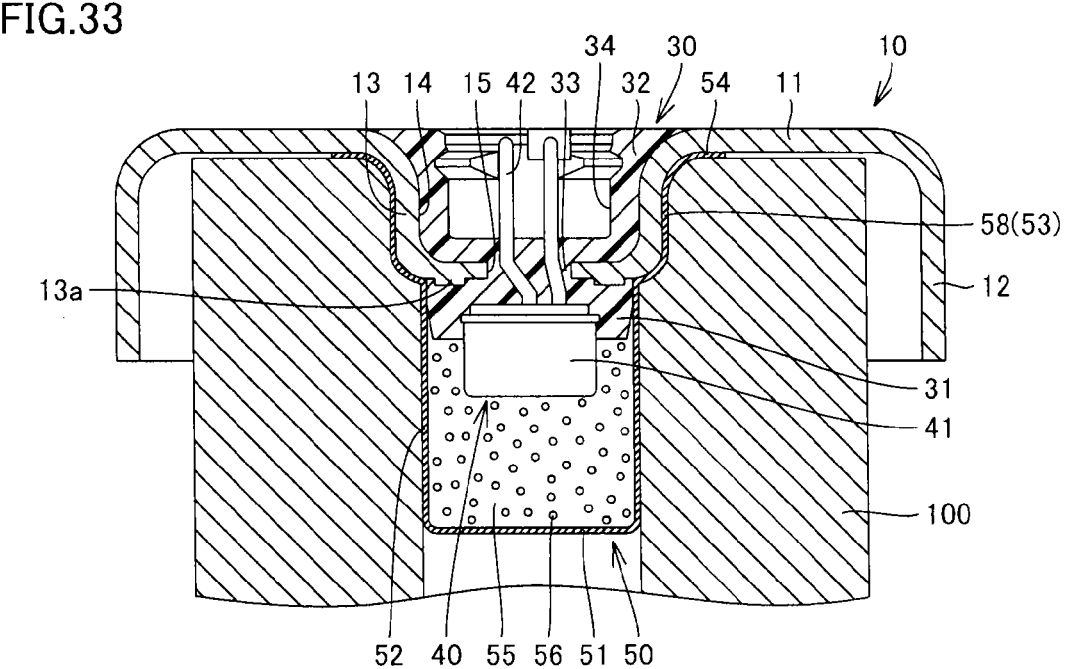
FIG. 33 is a schematic sectional view for illustrating an assembling process of the gas generator shown in FIG. 30.

FIG. 30 is a schematic view of a gas generator in Embodiment 9 of the present invention, and FIG. 31 is an enlarged schematic sectional view of an essential part of region XXXI shown in FIG. 30 of the gas generator shown in FIG. 30. FIG. 32 and FIG. 33 are schematic sectional views for illustrating an assembling process of the gas generator shown in FIG. 30. Hereinafter, referring to FIG. 30 to FIG. 33, a gas generator 1S in Embodiment 9 of the present invention will be described.

As shown in FIG. 30 and FIG. 31, gas generator 1S in the present embodiment has almost identical configurations regarding various constituting parts including cup-shaped member 50 and first pad member 70 to those of gas generator 1G in Embodiment 2 described above, and differs from gas generator 1G in Embodiment 2 described above only in that cup-shaped member 50 is fixed to projecting cylindrical part 13 by pressure joining in place of being fixed to projecting cylindrical part 13 by press fitting.

Here, pressure joining fixation is a kind of joining methods for conducting fixation between metallic members, and joins the metal members in solid states by causing a certain degree of plastic deformation by pressure joining metallic members by pressing or the like. By utilizing the pressure joining fixation, it is possible to join the metallic members with relatively high joining power.

Concretely, in gas generator 1S, first extension part 53 of cup-shaped member 50 is fitted over projecting cylindrical part 13 of bottom plate part 11, and pressure joined by pressing using a pressing mold 100 (see FIG. 32 and so on) as will be described later, and thus pressure joining fixation to projecting cylindrical part 13 is achieved. The pressure joining fixation is conducted for temporarily fixing cup-shaped member 50 to facilitate the operation in assembling cup-shaped member 50 to the housing.

In gas generator 1S in which cup-shaped member 50 is fixed to projecting cylindrical part 13 by pressure joining in this manner, first extension part 53 of cup-shaped member 50 is in close contact with projecting cylindrical part 13, and cup-shaped member 50 is fixed to bottom plate part 11 mainly by joining between the inner circumferential face of first extension part 53 and the outer circumferential face of projecting cylindrical part 13 situated inside the housing.

Here, also in gas generator 1S of the present embodiment, first extension part 53 provided in cup-shaped member 50 extends along the inner bottom face of bottom plate part 11 so as to have a substantially S-shaped section from the open end side of lateral wall part 52, and tip part 54 thereof reaches the part of bottom plate part 11 where projecting cylindrical part 13 is not formed. On the other hand, second extension part 71 provided in first pad member 70 extends along the inner bottom face of bottom plate part 11 so as to have a substantially L-shaped section from the lower end part of abutting part 72, and its tip part 73 reaches the part of bottom plate part 11 where projecting cylindrical part 13 is formed (more specifically, the outer circumferential face situated inside the housing of projecting cylindrical part 13).

Tip part 54 of first extension part 53 is disposed between bottom plate part 11 and second extension part 71 along the axial direction of the housing, and as a result, tip part 54 is sandwiched and retained by bottom plate part 11 and second extension part 71 along the axial direction of the housing. Therefore, cup-shaped member 50 is fixed to bottom plate part 11 in the condition that tip part 54 of its first extension part 53 is pushed toward bottom plate part 11 by second extension part 71 of first pad member 70.

In assembling gas generator 1S, lower shell 10 that is produced by press molding, and igniter 40 that is previously produced are set in a mold for injection molding, and injection molding is conducted in this condition to form retainer 30 which is a resin molded part in bottom plate part 11 of lower shell 10, and thus igniter 40 is fixed to projecting cylindrical part 13 of lower shell 10.

Next, as shown in FIG. 32, cup-shaped member 50 that is previously produced by press molding is packed with a predetermined amount of transfer charge 56, and the part in the vicinity of projecting cylindrical part 13 of lower shell 10 in the condition that igniter 40 is fixed is inserted into cup-shaped member 50 from the open end side of cup-shaped member 50. Here, this insertion is conducted in the condition that both of cup-shaped member 50 and lower shell 10 are upside down for the purpose of preventing transfer charge 56 from spilling out.

At this time, cup-shaped member 50 is previously provided with a taper part 58 spreading outward in the part continuing from the part on the side of the open end of lateral wall part 52 (this part will be molded at the time of pressure joining fixation as will be described later to become first extension part 53) by press molding as described above, and is arranged so that taper part 58 covers a part in the vicinity of projecting cylindrical part 13 of lower shell 10.

Next, using mold 100 of a predetermined shape, mold 100 is pushed against lower shell 10 so that cup-shaped member 50 is sandwiched between mold 100 and lower shell 10, and thus cup-shaped member 50 is pressed. In this manner, as shown in FIG. 33, taper part 58 of cup-shaped member 50 as described above is molded to become first extension part 53 by plastic deformation while being sandwiched by mold 100 and projecting cylindrical part 13 of lower shell 10, and simultaneously, pressure joining fixation of cup-shaped member 50 to lower shell 10 of cup-shaped member 50 is conducted.

At this time, as shown in the drawing, by configuring outer circumferential faces situated inside the housing of a hem part 13d and a shoulder part 13e having a curved section shape (see FIG. 31) which are to occur in bottom plate part 13 at the time of forming projecting cylindrical part 13 by press molding or the like to be exposed without being covered by inner covering part 31 of retainer 30, not only the outer circumferential face of projecting cylindrical part 13 situated in the housing, but also the outer circumferential faces of hem part 13d and shoulder part 13e situated in the housing are joined with the inner circumferential face of first extension part 53 of cup-shaped member 50, so that it is possible to fix cup-shaped member 50 to lower shell 10 with high joining power.

After completion of pressure joining fixation of cup-shaped member 50 to lower shell 10 as described above, mold 100 is removed, and in a similar manner to the case of Embodiment 1 described above, lower shell 10 is turned upside down, and in this condition, filter 90 is placed on lower shell 10, and thereafter first pad member 70 is inserted into the space defined by lower shell 10 and filter 90. Thereafter, gas generating agent 61, cushion member 85, and second pad member 80 are assembled, and further, upper shell 20 is assembled and joined to cover lower shell 10 to complete production of gas generator 1S.

In the above, description was made while taking an assembling process including inserting into cup-shaped member 50 a part in the vicinity of projecting cylindrical part 13 of lower shell 10 in which igniter 40 is previously fixed, and fixing cup-shaped member 50 and lower shell 10 by pressure joining by using mold 100 as an example; however, pressure joining fixation between cup-shaped member 50 and lower shell 10 may be conducted by setting cup-shaped member 50 in mold 100 beforehand, and moving and pushing toward the part in the vicinity of projecting cylindrical part 13 of lower shell 10 mold 100 in which cup-shaped member 50 is set.

As described above, also with gas generator 1S in the present embodiment, it is possible to obtain similar effects to those described in Embodiment 2 described above, and to assemble cup-shaped member 50 accommodating transfer charge 56 to the housing securely and easily without use of swaging fixation or press-fit fixation that requires strict management of the assembling strength, and to produce gas generator 1S at a low cost. Further, since first extension part 53 is molded at the time of pressure joining fixation without necessity of previously providing cup-shaped member 50 with a predetermined shape of first extension part 53, further facilitation of production and cost reduction are achieved.

Related Art

Figure 34:
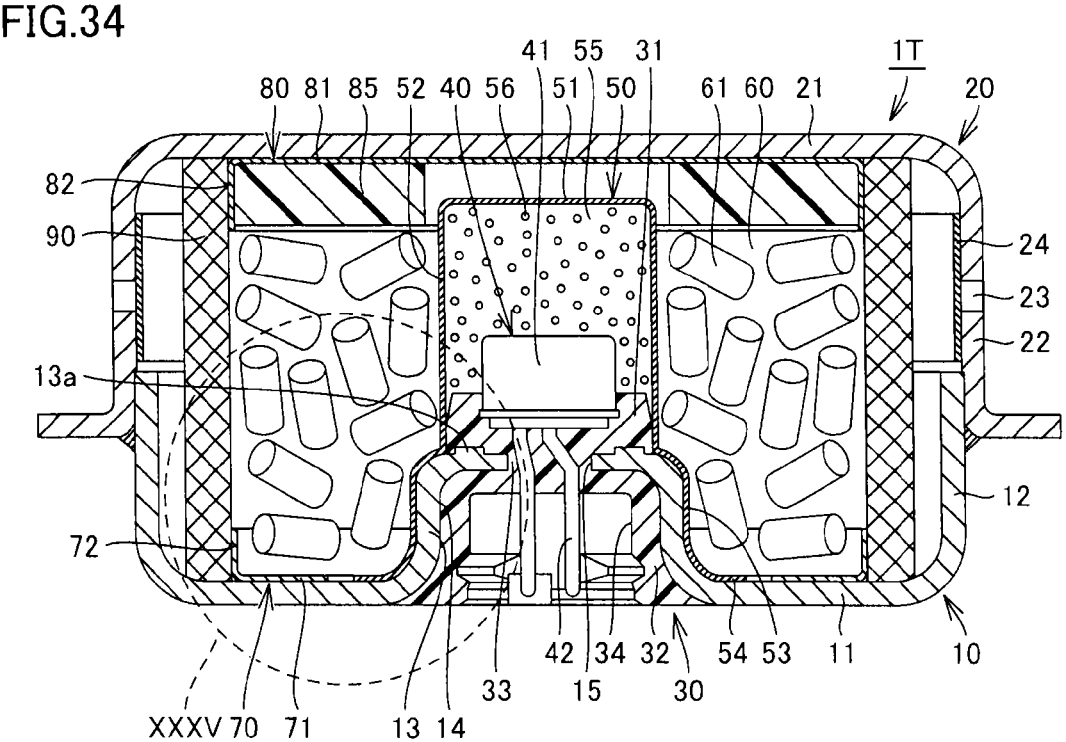
FIG. 34 is a schematic view of a gas generator according to a related art related with the present invention.
Figure 35:
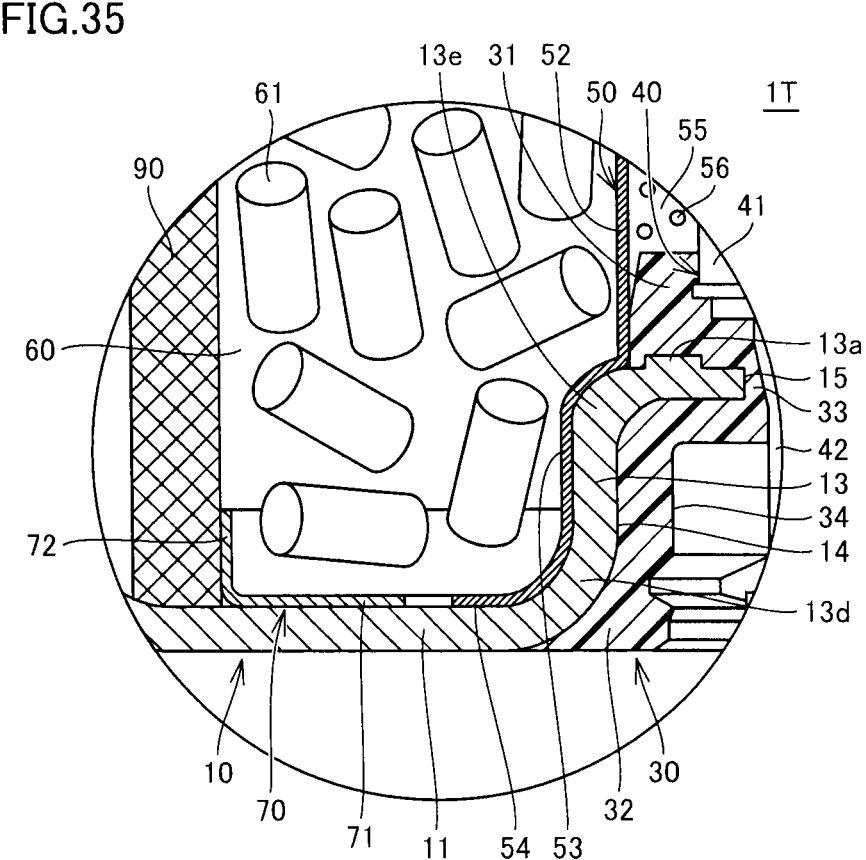
FIG. 35 is an enlarged schematic sectional view of an essential part of the gas generator shown in FIG. 34.

FIG. 34 is a schematic view of a gas generator according to a related art related with the present invention, and FIG. 35 is an enlarged schematic sectional view of an essential part of region XXXV shown in FIG. 34 of the gas generator shown in FIG. 34. Hereinafter, referring to FIG. 34 and FIG. 35, a gas generator 1T according to the related art related with the present invention will be described.

When cup-shaped member 50 is joined with lower shell 10 by utilizing the pressure joining fixation described in Embodiment 9, the joining power can be maintained relatively high, and hence cup-shaped member 50 can be fixed to lower shell 10 stably with such joining power. Therefore, when the pressure joining fixation is utilized, it is possible to prevent cup-shaped member 50 from falling off and to prevent transfer charge 56 and gas generating agent 61 from mixing with each other without necessity of sandwiching cup-shaped member 50 with lower shell 10 by using first pad member 70.

Therefore, in this related art, cup-shaped member 50 is fixed to lower shell 10 by pressure joining to make gas generator 1T in which cup-shaped member 50 accommodating transfer charge 56 can be assembled to the housing securely and easily, and accordingly producible with reduced production cost.

Concretely, as shown in FIG. 34 and FIG. 35, gas generator 1T according to the present related art has almost identical configurations regarding various constituting parts excluding first pad member 70 to those of gas generator 1S in Embodiment 9 described above, and differs from gas generator 1S in Embodiment 9 described above only in that cup-shaped member 50 is not sandwiched and retained between first pad member 70 and lower shell 10.

More specifically, in gas generator 1T, first extension part 53 of cup-shaped member 50 is fitted over projecting cylindrical part 13 of bottom plate part 11, and pressure joined by pressing using a mold, and thus fixed to projecting cylindrical part 13 by pressure joining. The pressure joining fixation is intended to fix cup-shaped member 50 to the housing stably so as to prevent cup-shaped member 50 from falling off the housing due to vibration or the like.

In gas generator 1T in which cup-shaped member 50 is fixed to projecting cylindrical part 13 by pressure joining in this manner, first extension part 53 of cup-shaped member 50 is in close contact with projecting cylindrical part 13, and cup-shaped member 50 is fixed to bottom plate part 11 mainly by joining between the inner circumferential face of first extension part 53 and the outer circumferential face of projecting cylindrical part 13 situated inside the housing.

On the other hand, second extension part 71 provided in first pad member 70 extends from the lower end side of abutting part 72 along the inner bottom face of bottom plate part 11 to have a substantially L-shaped section, but does not reach the part of bottom plate part 11 where projecting cylindrical part 13 is formed (more specifically, the outer circumferential face of projecting cylindrical part 13 situated inside the housing). Therefore, tip part 54 of first extension part 53 is not covered by second extension part 71 along the axial direction of the housing, and is exposed to the internal space of the housing.

Although description will be omitted for avoiding repetition, an assembling procedure in assembling gas generator 1T according to the present related art follows the assembling procedure in assembling gas generator 1S in Embodiment 9 described above.

With gas generator 1T according to the present related art, first extension part 53 of cup-shaped member 50 is not sandwiched between first pad member 70 and second extension part 71 of bottom plate part 11 along the axial direction of the housing; however, cup-shaped member 50 is fixed to lower shell 10 stably by the joining power obtained by fixing cup-shaped member 50 to lower shell 10 by pressure joining.

Therefore, it is possible to assemble cup-shaped member 50 accommodating transfer charge 56 to the housing securely and easily without use of swaging fixation or press-fit fixation that requires strict management of the assembling strength, and to produce gas generator 1T at a low cost. Further, since first extension part 53 is molded at the time of pressure joining fixation without necessity of previously providing cup-shaped member 50 with a predetermined shape of first extension part 53, further facilitation of production and cost reduction are achieved.

In the foregoing Embodiments 1 to 9 and modified examples thereof according to the present invention, the case of forming an upper shell and a lower shell of a press-molded product molded by pressing a metallic member is exemplified; however, not limited to this, an upper shell and a lower shell formed by combination of pressing and other process (forging, reducing, cutting and so on) may be used, or an upper shell and a lower shell formed by the other process described above may be used.

In the foregoing Embodiments 1 to 9 and modified examples thereof according to the present invention, the case of providing the lower shell with a projecting cylindrical part is exemplified; however, the present invention is naturally applicable to a gas generator that is not provided with the projecting cylindrical part.

Also, in the foregoing Embodiments 1 to 9 and modified examples thereof according to the present invention, the case of enabling fixation of the igniter to the lower shell by injection molding a retainer formed of a resin molded part is exemplified, however, the present invention is naturally applicable to a gas generator in which fixation of the igniter to the lower shell is realized by other alternative means.

Further, characteristic configurations shown in the foregoing Embodiments 1 to 9 and modified examples thereof according to the present invention can be naturally combined mutually within the range allowable in light of the spirit of the present invention. Also, concrete shapes and the like of various constituting parts including housing, igniter, retainer, cup-shaped member, and first pad member can be naturally modified as appropriate.

Embodiments and modified examples thereof disclosed herein are given for exemplification in any respects, and are not restrictive. The technical scope of the present invention is defined by claims, and involves any modifications within the equivalent meanings and scopes of description in claims.

REFERENCE SIGNS LIST 1A-1T gas generator, 10 lower shell, 11 bottom plate part, 12 peripheral wall part, 13 projecting cylindrical part, 13a protrusion, 13b recess, 13c second projection part, 13d hem part, 13e shoulder part, 14 recess part, 15 opening, 20 upper shell, 21 top plate part, 22 peripheral wall part, 23 gas discharge opening, 24 sealing tape, 30 retainer, 31 inner covering part, 31a first projection part, 32 outer covering part, 33 connecting part, 34 female connector part, 40 igniter, 41 ignition part, 42 terminal pins, 50 cup-shaped member, 51 top wall part, 52 lateral wall part, 52a first projection part, 53 first extension part, 53a second projection part, 54 tip part, 55 transfer charge chamber, 56 transfer charge, 58 taper part, 60 combustion chamber, 61 gas generating agent, 62,63 space, 70 first pad member, 71 second extension part, 72 abutting part, 73 tip part, 74 tip curved part, 75 cushion member, 80 second pad member, 81 bottom part, 82 abutting part, 85 cushion member, 90 filter, 100 mold.

The invention claimed is:
1. A gas generator comprising:
a housing in a shape of a short cylinder, the housing being made up of a top plate part and a bottom plate part that close axial end parts, and a peripheral wall part provided with a gas discharge opening, and containing a combustion chamber accommodating a gas generating agent, an igniter attached to said bottom plate part, and containing an ignition part accommodating an ignition charge that ignites in actuation, a cup-shaped member in a shape of a substantial cylinder opening in an end part on a side of said bottom plate part, the cup-shaped member containing a transfer charge chamber accommodating a transfer charge, and disposed to project toward inside said combustion chamber in such a manner that said transfer charge chamber faces said ignition part, a cylindrical filter situated inside said housing, and disposed to surround said combustion chamber in a radial direction of said housing, and an annular first pad member situated between said bottom plate part and said gas generating agent in a part of said combustion chamber on the side of said bottom plate part, and applied to cover a boundary between said filter and said bottom plate part, said cup-shaped member having a top wall part and a lateral wall part defining said transfer charge chamber, and a first extension part extending outwardly in a radial direction along an inner bottom face of said bottom plate part from a part of said lateral wall part on a side of the open end, said first pad member having an abutting part abutting with an inner circumferential face of an axial end part situated on the side of said bottom plate part of said filter, and a second extension part extending from said abutting part inwardly in the radial direction along the inner bottom face of said bottom plate part, wherein by at least a part of said first extension part being arranged between said bottom plate part and said second extension part along an axial direction of said housing, movement of said cup-shaped member along the axial direction of said housing is restricted, and said cup-shaped member is assembled to said bottom plate part.

2. The gas generator according to claim 1, wherein at least a part of said first extension part is sandwiched and retained between said bottom plate part and said second extension part along the axial direction of said housing to fix said cup-shaped member to said bottom plate part.

3. The gas generator according to claim 1, wherein between said second extension part and said bottom plate part of a part defining said combustion chamber, a space where said first extension part is not situated is formed.

4. The gas generator according to claim 1, further comprising:

a retainer, provided on said bottom plate part, for retaining said igniter, wherein said bottom plate part is provided with an opening through which said igniter is inserted and arranged, said retainer is formed of a resin molded part at least partly fixed to said bottom plate part by being formed by hardening a fluid resin material that is adhered to said bottom plate part in such a manner that the fluid resin material reaches a part of an outer face of said bottom plate part from a part of an inner face of said bottom plate part through said opening, and said cup-shaped member is fixed to said retainer by press-fitting a part of said cup-shaped member on the side of the open end of said lateral wall part into a part of said retainer situated inside said housing.

5. The gas generator according to claim 4, wherein either the inner circumferential face in a part on the side of the open end of said lateral wall part of said cup-shaped member or the outer circumferential face in a part of said retainer situated inside said housing is provided with a first projection part, and in the part where said first projection part is provided, said cup-shaped member is press-fitted into said retainer.

6. The gas generator according to claim 4, wherein a surface of said bottom plate part in a part covered by said retainer is provided with a protrusion for preventing rotation, or a recess for preventing rotation to prevent said retainer from relatively rotating with respect to said bottom plate part.

7. The gas generator according to claim 4, wherein said bottom plate part has a projecting cylindrical part projecting toward said top plate part, said opening is provided in an axial end part situated on a side of said top plate part of said projecting cylindrical part, and said first extension part is press-fitted into said projecting cylindrical part to fix said cup-shaped member to said bottom plate part.

8. The gas generator according to claim 7, wherein either the inner circumferential face of said first extension part or the outer circumferential face of said projecting cylindrical part is provided with a second projection part, and in the part where said second projection part is provided, said cup-shaped member is press-fitted into said projecting cylindrical part.

9. The gas generator according to claim 4, wherein said bottom plate part has a projecting cylindrical part projecting toward said top plate part, said opening is provided in an axial end part situated on the side of said top plate part of said projecting cylindrical part, and said cup-shaped member is plastically deformed by being pushed against said projecting cylindrical part to form said first extension part, and said first extension part is pressure joined with said projecting cylindrical part to fix said cup-shaped member to said bottom plate part.

10. The gas generator according to claim 1, further comprising:

a cushion member, situated between said top plate part and said gas generating agent in a part on the side of said top plate part of said combustion chamber, for pushing said gas generating agent toward said bottom plate part, wherein said cushion member is brought into abutment with said top wall part of said cup-shaped member to fix said cup-shaped member to said bottom plate part.

11. The gas generator according to claim 1, further comprising:

a second pad member situated between said top plate part and said gas generating agent in a part of said combustion chamber on the side of said top plate part, and applied to cover a boundary between said filter and said top plate part, wherein said second pad member is brought into abutment with said top wall part of said cup-shaped member to fix said cup-shaped member to said bottom plate part.

12. The gas generator according to claim 1, wherein said top plate part is brought into abutment with said top wall part of said cup-shaped member to fix said cup-shaped member to said bottom plate part.

* * * * *